(12) United States Patent
Saxena et al.

(10) Patent No.: US 8,772,422 B2
(45) Date of Patent: *Jul. 8, 2014

(54) POLYMER COMPOSITES OF SILICONE IONOMERS

(71) Applicant: Momentive Performance Materials Inc., Albany, NY (US)

(72) Inventors: Anubhav Saxena, Bangalore (IN); Srividhya Marimuthu, Bangalore (IN); Alok Sarkar, Malda (IN); Pranav Ramchandra Joshi, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,236

(22) Filed: Dec. 20, 2012

(65) Prior Publication Data

US 2013/0172419 A1 Jul. 4, 2013

Related U.S. Application Data

(60) Provisional application No. 61/582,918, filed on Jan. 4, 2012.

(51) Int. Cl.
 *C08L 83/08* (2006.01)
(52) U.S. Cl.
 USPC ........ 525/474; 526/279; 526/317.1; 526/319; 526/323.1; 526/303.1; 528/25; 528/26; 528/30; 528/31; 528/32
(58) Field of Classification Search
 None
 See application file for complete search history.

(56) References Cited

U.S. PATENT DOCUMENTS

| | | | |
|---|---|---|---|
| 4,469,499 A | 9/1984 | Lecron et al. | |
| 4,532,185 A * | 7/1985 | Balchunis et al. | 428/447 |
| 5,789,628 A * | 8/1998 | Auer et al. | 568/727 |
| 6,331,578 B1 | 12/2001 | Turner et al. | |
| 7,687,585 B2 | 3/2010 | Karthauser et al. | |
| 2006/0258820 A1* | 11/2006 | Schneider | 525/477 |
| 2007/0299140 A1 | 12/2007 | Kennan et al. | |
| 2008/0293878 A1* | 11/2008 | Funk et al. | 524/588 |
| 2013/0171265 A1* | 7/2013 | Saxena et al. | 424/618 |
| 2013/0172193 A1* | 7/2013 | Saxena et al. | 504/360 |
| 2013/0172427 A1* | 7/2013 | Saxena et al. | 514/772.1 |

FOREIGN PATENT DOCUMENTS

| | | |
|---|---|---|
| EP | 581 296 A2 * | 7/1993 |
| EP | 1840167 A1 | 1/2006 |
| JP | 6 025420 A | 2/1994 |
| JP | 6 247827 A | 9/1994 |
| JP | 10 273414 A | 10/1998 |
| WO | 2010124187 A2 | 10/2010 |

OTHER PUBLICATIONS

Database WPI Week 199409 Thomson Scientific, London, GB; AN 1994-072023; XP002694715.
S.A. Snow et al., "Synthesis and Characterization of Zwitterionic Silicone Sulfobetaine Surfactants", Langmuir, American Chemical Society, New York, NY; US, vol. 6, No. 2, Jan. 1, 1990, pp. 385-391, XP002428884, ISSN: 0743-7463, DOI: 10.1021/LA00092A017 p. 388, col. 1; table I abstract.
Database WPI Week 199440 Thomson Scientific, London, GB; AN 1994-322069; XP002694716.
Database WPI Week 199851 Thomson Scientific, London, GB; AN 1998-603217; XP002694717.
International Search Report and Written Opinion dated Apr. 10, 2013.

* cited by examiner

*Primary Examiner* — Marc Zimmer
(74) *Attorney, Agent, or Firm* — Dominick G. Vicari

(57) ABSTRACT

A polymer composite composition wherein at least one of the constituents is a silicone ionomer and the other constituent is polymer.

45 Claims, 7 Drawing Sheets

DSC thermogram of ibuprofen solid drug

DSC thermogram of ibuprofen loaded silicone ionomer PSA

Drug melting peak absent

DSC thermogram of ibuprofen loaded PDMS film

POLYMER COMPOSITES OF SILICONE IONOMERS

CROSS REFERENCE TO RELATED APPLICATIONS

The present application claims priority to U.S. Provisional application No. 61/582,918 filed Jan. 4, 2012 which is herein incorporated by reference.

BACKGROUND

1. Field of the Invention

The present invention relates to polymer composites comprising silicone ionomers.

2. Background of the Art

Several approaches have been developed to combine silicones with non-silicone polymers to form a single polymeric composition. The approach closest to the present invention includes silicone-based interpenetrating polymer networks (IPNs) and their variants. This method comprises the juxtaposition of two or more distinct polymer chains in the form of a network, such that the resulting material has properties shown by all of its constituents. The following are examples of state of art describing silicone-based IPNs:

European Patent application (EP1840167 A1) describes a transparent gel and contact lens based on the same, comprising of an interpenetrating network between a polycarbonate-modified polydiorganosiloxane and a hydrophilic curable monomer.

U.S. Pat. No. 7,687,585 describes a method of preparing silicone-based IPN by swelling the polymer with a monomer dissolved in a low surface tension solvent (e.g. supercritical $CO_2$), precipitating the monomer via solvent removal and subsequently crosslinking the monomer within the silicone framework.

The U.S. Pat. No. 6,331,578 also describes a silicone-acrylate IPN made by sequential polymerization of PDMS, imbibition with acrylate monomer, and crosslinking the same to form a penetrating network.

U.S. Pat. No. 4,469,499 covers interpenetrating networks in which the constituent polymers are held together by ionic attractions between the participating sites. The objects of this invention are thermosets at a certain temperature, above which they show thermoplastic behavior.

While the above examples independently describe polydiorganosiloxane-based IPNs or IPNs based on ionic interactions between the two polymers, they fail to mention ionically modified polydiorganosiloxanes as one of the IPN constituents. Thus, the silicone ionomers that are a component of the present invention are a significant feature of the invention.

The present invention seeks to combine silicone ionomers with other polymers to provide polymer composite compositions. The resulting polymer composition possesses properties that are additive or synergistic of the properties of the participating reactants. On account of these properties, the composites can be used in different applications such as healthcare, personal care, automotive, construction, apparel, sporting goods, electrical and electronic applications, textile applications, oil and gas and household goods and articles.

SUMMARY

Provided herein is a polymer composite comprising of at least two constituents wherein at least one of the constituents is a silicone ionomer.

The presence of ionic groups in polydiorganosiloxane chains makes them compatible with a variety of polymers that are normally incompatible with unmodified polydiorganosiloxanes. The ionic groups in these silicone ionomers undergo non-directional, reversible interactions with each other and with the ionic groups that may be present on the surrounding polymer or with other silicone ionomers, thereby forming aggregates. Lastly, the ionic groups on the silicones can also act as binding sites for active agents for controlled release. The object of the present invention thus comprises novel, silicone-ionomer based polymer composite compositions that can be useful in the areas of healthcare, personal care, automobile, construction, paints, coatings, household, textile and apparel, laundry detergents, agriculture, oil and gas, membranes, electrical/electronic applications, electro-optics, fabrication, adhesives as well as for the manufacture of highly engineered materials in form of gels, films, coatings and sealants, and moldable elastomer rubbers.

DETAILED DESCRIPTION OF PREFERRED EMBODIMENT(S)

Figure 1:
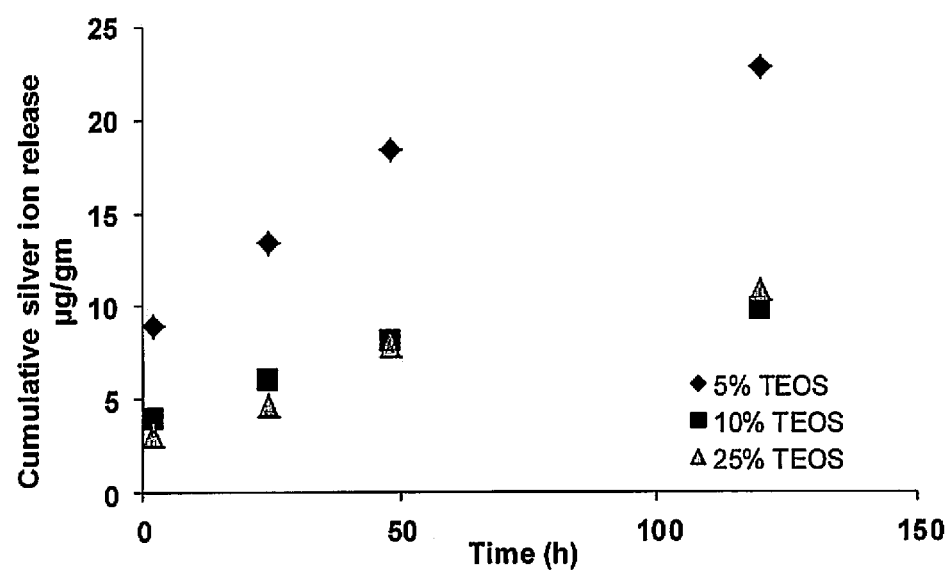
FIG. 1 is a graph showing cumulative release of silver ions from polymer composite PSA containing sulfonated silicone ionomer.

In the specification and claims herein, the following terms and expressions are to be understood as indicated.

As used in the specification and including the appended claims, the singular forms "a," "an," and "the" include the plural, and reference to a particular numerical value includes at least that particular value, unless the context clearly dictates otherwise.

Ranges can be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

Other than in the working examples or where otherwise indicated, all numbers expressing amounts of materials, reaction conditions, time durations, quantified properties of materials, and so forth, stated in the specification are to be understood as being modified in all instances by the term "about."

It will be understood that any numerical range recited herein includes all sub-ranges within that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon" means any hydrocarbon group from which one or more hydrogen atoms has been removed and is inclusive of alkyl, alkenyl, alkynyl, cyclic alkyl, cyclic alkenyl, cyclic alkynyl, aryl, aralkyl and arenyl and nay contain heteroatoms.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expressions "cyclic alkyl", "cyclic alkenyl", and "cyclic alkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include phenyl and naphthalenyl. Examples of aralkyls include benzyl and phenethyl. Examples of arenyls include tolyl and xylyl.

It will be understood herein that all measures of viscosity are obtained at 25 degrees Celsius unless noted otherwise.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

The present invention is a polymer composite composition that comprises of at least one silicone ionomer. The components of the invention are preferably present in close juxtaposition and are in form of a network. In addition the composition may also comprise of other agents that aid in the formation of the said polymer composite or provide additional functionality to the composition. The attributes of each of the components are herein described in detail:

A. The Silicone Ionomer

The silicone ionomers in this composition are compositions comprising a silicone of the formula (I):

$$M^1_a M^2_b M^3_c D^1_d D^2_e D^3_f T^1_g T^2_h T^3_i Q_j \quad \text{(I)}$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$D^1 = R^{10} R^{11} SiO_{2/2}$
$D^2 = R^{12} R^{13} SiO_{2/2}$
$D^3 = R^{14} R^{15} SiO_{2/2}$
$T^1 = R^{16} SiO_{3/2}$
$T^2 = R^{17} SiO_{3/2}$
$T^3 = R^{18} SiO_{3/2}$
$Q = SiO_{4/2}$ where $R^1, R^2, R^3, R^5, R^6, R^8, R^9, R^{10}, R^{11}, R^{13}, R^{15}, R^{16}$ are aliphatic, aromatic or fluoro containing monovalent hydrocarbon radicals containing from 1 to about 60 carbon atoms, specifically from 1 to about 20 carbon atoms and more specifically from 1 to about 8 carbon atoms;

where $R^4, R^{12}, R^{17}$ are monovalent radical bearing ion-pairs and have the formula $$-A-I^{x-}M^{y+}_n; \quad \text{(II)}$$

where A is a spacing group selected from a divalent hydrocarbon or hydrocarbonoxy group, where I is an ionic group such as sulfonate —$SO_3^-$, sulfate —$OSO_3^-$, carboxylate —$COO^-$, phosphonate —$PO_3^{2-}$ and phosphate —$OPO_3^{2-}$ group, more specifically sulfonate —$SO_3^-$;

where M is hydrogen or a cation independently selected from alkali metals, alkaline earth metals, rare earth metals, transition metals, metals, metal complexes, quaternary ammonium and phosphonium groups; or, zwitterions having the formula (III):

$$-R'-NR''^+_2-R'''-I \quad \text{(III)}$$

where R' is a divalent hydrocarbon radical containing from 1 to about 60 carbon atoms, specifically from 1 to about 20 carbon atoms, and more specifically from 1 to about 8 carbon atoms, where R" is monovalent hydrocarbon radical containing from 1 to about 60 carbon atoms, specifically from 1 to about 20 carbon atoms and more specifically from 1 to about 8 carbon atoms, and where R'" is divalent hydrocarbon radical containing from 2 to about 20 carbon atoms, specifically from 2 to about 8 carbon atoms and more specifically from 2 to about 4 carbon atoms; and, where I is an ionic group such as sulfonate —$SO_3^-$, sulfate —$OSO_3^-$, carboxylate —$COO^-$, phosphonate —$PO_3^{2-}$ group and phosphate —$OPO_3^{2-}$ group.

where $R^7$, $R^{14}$, and $R^{18}$ are independently selected from hydrogen, —$OR^{20}$, unsaturated monovalent radicals or monovalent epoxy group-containing radicals, monovalent sulfur atom-containing radicals and monovalent organosilane groups, and monvalent hydroxyl group containing radicals, and a monovalent hydrocarbon containing one or more of a halogen moiety, a carboxylate moiety, an imine moiety, an isocyanate moiety, an amide moiety, a nitrile moiety, or a tertiary amine moiety containing other than alkyl groups moiety, where $R^{20}$ is hydrogen or a monovalent hydrocarbon radical of from 2 to about 60 specifically from 1 to about 20 carbon atoms, more specifically from 1 to about 8 carbon atoms otherwise where superscripts n and y are independently from 1 to 6 and x is a product of n and y where the subscript a, b, c, d, e, f, g, h, i, j are zero or positive subject to the following limitations: the sum a+b+c+d+e+f+g+h+i+j is greater than or equal to 2 and less than or equal to 6000, specifically a+b+c+d+e+f+g+h+i+j is greater than or equal to 2 and less than or equal to 4000, more specifically a+b+c+d+e+f+g+h+i+j is less than or equal to 2000, b+e+h is greater than 0.

In one embodiment herein the monovalent hydrocarbon radical of $R^1$, $R^2$, $R^3$, $R^5$, $R^6$, $R^8$, $R^9$, $R^{10}$, $R^{11}$, $R^{13}$, $R^{15}$, $R^{16}$ is independently selected from the group consisting of methyl, ethyl, n-propyl, iso-propyl, n-butyl, isobutyl, tert-butyl, n-pentyl, iso-pentyl, neopentyl, tert-pentyl, hexyl, such as the n-hexyl group, heptyl, such as the n-heptyl group, octyl, such as the n-octyl and isooctyl groups, 2,2,4-trimethylpentyl, nonyl, such as the n-nonyl group, decyl, such as the n-decyl group, cycloalkyl radicals, such as cyclopentyl, cyclohexyl, cycloheptyl and methylcyclohexyl, and aryl groups such as phenyl, naphthyl; o-, m- and p-tolyl, xylyl, ethylphenyl, and benzyl.

In one other embodiment herein the divalent hydrocarbon group of A in formula (II) is an arylene group selected from the group consisting of divalent hydrocarbon group is an arylene group selected from the group consisting of —$(CHR')_kC_6H_4(CH_2)_l$—, —$CH_2CH(R')(CH_2)_kC_6H_4$—, —$CH_2CH(R')(CH_2)_lC_6H_3R"$— and □$CH_2CH(R')(CH_2)_lC_6H_2R_jR"$— where R' is a hydrogen or defined by $R^1$, R" is a monovalent radical specifically from about 1 to about 20 carbon atoms, more specifically from about 1 to about 8 carbon atoms, sulfur atom(s), nitrogen atom(s), oxygen atom(s) or a radical containing combinations of the above atoms, where l has a value of 0 to 20, and k has a value of 0 to 20, specifically from 0 to about 10.

In another embodiment, the divalent hydrocarbon group of A in formula (II) is an alkylene group of the formula —$(CHR^{19})_m$— where m has a value of 1 to 20, specifically, from 1 to about 10 and $R^{19}$ is hydrogen or $R^1$.

In another embodiment the divalent hydrocarbonoxy group of A in formula (II) is selected from —$(CHR^{19})_m$—(O—$CHR^{19}CH_2)_m$—O—$(CH_2)_l$— where l has a value of from 1 to 20, specifically from 1 to about 10, m has a value of 0 to 50 and m' has the value from 0 to 50.

In one other embodiment, in formula (II) M can be a cation independently selected from Li, Na, K, Cs, Mg, Ca, Ba, Zn, Cu, Fe, Ni, Ga, Al, Mn, Cr, Ag, Au, Pt, Pd, Pb, Sb, Ru, Sn Rh Ce, Eu, Gd, Co and La. One skilled in the art can understand that the cations are not limited to the above said, and also can exist in multivalent forms e.g., $Mn^{+2}$ and $Mn^{+3}$ In another embodiment in formula (I) $R^7$, $R^{14}$ and $R^{18}$ are a monovalent hydrocarbon radical selected from the group of the formulae (IV) to (XIV)

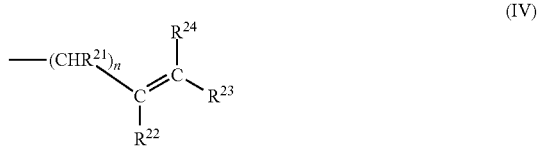

(IV)

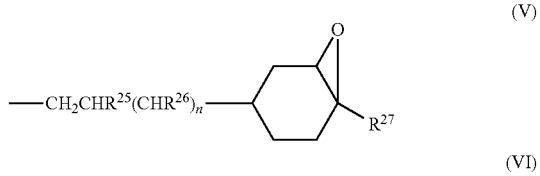

(V)

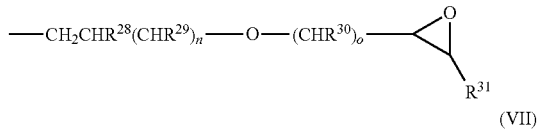

(VI)

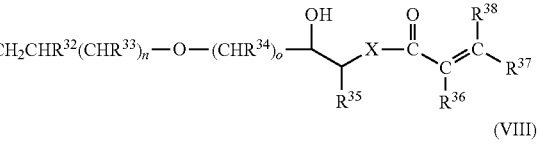

(VII)

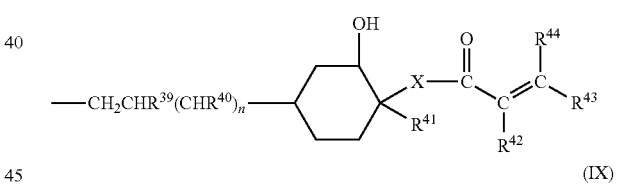

(VIII)

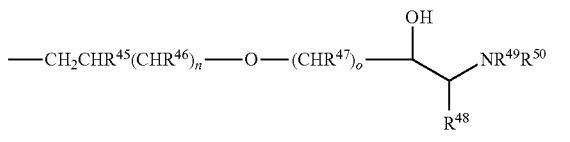

(IX)

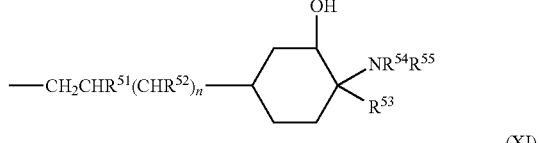

(X)

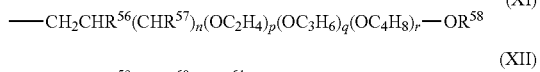

(XI)

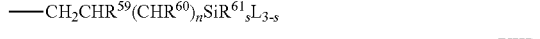

(XII)

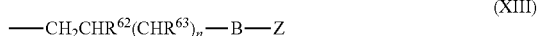

(XIII)

(XIV)

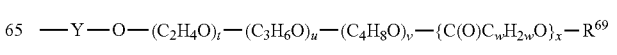

where $R^{21}, R^{26}, R^{29}, R^{30}, R^{33}, R^{34}, R^{40}, R^{46}, R^{47}, R^{52}, R^{63}$ are independently selected from —H, —OH, —$R^{66}$ and aliphatic/aromatic monovalent hydrocarbon having from 1 to about 60 carbon atoms;

where $R^{22}, R^{23}, R^{24}, R^{25}, R^{27}, R^{28}, R^{31}, R^{32}, R^{35}, R^{36}, R^{37}, R^{38}, R^{39}, R^{41}, R^{42}, R^{43}, R^{44}, R^{45}, R^{48}, R^{51}, R^{53}, R^{56}, R^{57}, R^{59}, R^{60}, R^{61}$, are independently selected from hydrogen, aliphatic/aromatic monovalent hydrocarbon having from 1 to about 60 carbon atoms, specifically from 1 to about 20 carbon atoms, more specifically from 1 to about 8 carbon atoms;

where $R^{58}$ is aliphatic/aromatic monovalent hydrocarbon having from 2 to about 60 carbon atoms, specifically from 2 to about 20 carbon atoms, more specifically from 2 to about 8 carbon atoms;

where $R^{49}, R^{50}, R^{54}, R^{55}$ are independently selected from —H, —$C_tH_{2t}OH$ and aliphatic/aromatic monovalent hydrocarbon having from 1 to 60 carbon atoms, specifically from 1 to about 20 carbon atoms, more specifically from 1 to about 8 carbon atoms, wherein t is a positive integer, specifically from about 1 to about 20, where L is a monovalent radical independently selected from halogen, $OR^{64}$, —$CO(O)R^{65}$, —$N{=}CR^{66}_2$, —NCO, —$NC(O)R^{67}$, —C≡N, —N≡N and —$NR^{68}_2$, where $R^{64}$, $R^{65}$, $R^{66}$, $R^{67}$, $R^{68}$ are independently selected from a group consisting of hydrogen and alkyl, alkenyl, cycloalkyl and aryl containing from 1 to about 60 carbon atoms, specifically from 1 to about 20 carbon atoms, more specifically from 1 to about 8 carbon atoms;

where Z is a monovalent radical independently selected from halogen, $OR^{64A}$, —$CO(O)R^{65}$, —$N{=}CR^{66}_2$, —NCO, —$NC(O)R^{67}$, —C≡N, —N≡N and —$NR^{68A}_2$ where $R^{65}$, $R^{66}$, $R^{67}$ are independently selected from a group consisting of hydrogen and alkyl, alkenyl, cycloalkyl and aryl containing from 1 to about 60 carbon atoms, specifically from 1 to about 20 carbon atoms, more specifically from 1 to about 8 carbon atoms and $R^{64A}$ is hydrogen or selected from a group consisting of alkyl, alkenyl, cycloalkyl and aryl containing from 1 to about 60 carbon atoms, specifically from 1 to about 20 carbon atoms, more specifically from 1 to about 8 carbon atoms, and where $R^{68A}$ is selected from a group consisting of alkenyl, cycloalkyl and aryl containing from 1 to about 60 carbon atoms, specifically from 1 to about 20 carbon atoms, more specifically from 1 to about 8 carbon atoms;

where X is divalent radical selected from —O—, —N— and —S— linkages, where Y and B are divalent radical selected from a linear, branched, cyclic hydrocarbon radical or aralkyl radical containing from 1 to about 60 carbon atoms, specifically from 1 to about 20 carbon atoms, more specifically from 1 to about 8 carbon atoms, and may contain heteroatom;

where $R^{69}$ is hydrogen or a monovalent alkyl radical with 2 to about 20 carbon atoms or an acyl group, where the subscript n is zero or positive integer and has a value in the range of 0 to about 60, where subscript o is positive integer and has a value in the range of 1 to about 60, where subscripts p, q and r are zero or positive and independently selected from a value in the range of 0 to about 100, subject to the limitation of $p+q+r \geq 1$ and s is zero or positive integer and has a value of 0 to about 2.

where t, u, v and x can be zero or positive integers subject to the limitation $t+u+v+x$ is greater than or equal to 1 and w is a positive integer.

In yet another specific embodiment, the subscripts of formula (I) are such that $a+b \geq 2$, $d+e \geq 0$, $g+h \geq 0$ and subject to the limitation that $b+e+h>0$.

In addition to the above, the silicone ionomers of the present composition also comprise of ionically modified polydiorganosiloxanes in which the degree of ionic modification is such that these are capable of forming elastomeric compositions. The elastomeric compositions result from silicone ionomers through the ionic aggregates, which provide the control release of actives along with improved flexibility and water absorbing benefits. The silicone elastomers of the present invention particularly are characterized by the assembly of the ionic groups at ion rich domains of specific dimensions of 40-200 nm which act as the ionic filler to the silicone elastomer. These ionic assemblies are completely neutralized by the suitable counter ions to stabilize the charge. The ion rich domains help in the formation of transparent to translucent silicone elastomers that show improved water absorption, and are capable of controlled delivery of the active ingredients in different applications with a great control on the reproducibility. High oxygen permeability, comfort, improved flexibility are governed by the hydrophobic siloxane domains whereas the high water absorbing property and slow and sustained release of active ingredients are governed by the ionic aggregates.

(B) Polymers

In addition to the silicone ionomer, polymers are another component of the present invention. The polymers participate as materials that are capable of undergoing substantial and relatively rapid polymerization and crosslinking to form the polymer composite composition of the instant invention. The materials undergo such a transformation independently as well as in the presence of the silicone ionomer. The crosslinking can be via any of the chemical bond formation mechanisms known to those skilled in the art, and can be initiated thermally or via actinic radiation. In yet another embodiment of the invention, the polymers are present in form of their completely or partially polymerized forms such as oligomers and prepolymers, in which they may or may not possess polymerizable functionalities. Furthermore, the polymers of the present invention may also participate in additional non-covalent interactions or form covalent bonds with the silicone ionomers. Some non-limiting examples of non-covalent interactions can be due to the compatibility of specific segments of the polymer with the silicone ionomer on account of their ionic nature, crystallinity, hydrophobicity, polarity, acid-base interactions or hydrogen bonding, or via the formation of co-ordination complexes involving multi-valent functional groups on the silicone ionomer, the reactive polymer and a common metal ion.

Preferably, the non-covalent interactions are ionic interactions between charged groups on the ionomer and on the reactive polymer, when such groups are present on the latter.

Even more preferably, the ionically interacting charged groups on the silicone ionomers and the reactive polymer components are the same. Some examples of reactive polymers bearing ionic groups include, but are not limited to: sulfonated poly(styrenes), sulfonated poly(phenylene oxide), 2-acrylamido methyl propanesulfonic acids, sulfoethyl acrylate, sulfopropyl acrylate, and other sulfonated polymer structures for interaction with sulfonated silicones; polymers of (meth)acrylic acid and its derivatives, 2-carboxyethyl acrylate and others that possess pendant carboxyl groups for interaction with carboxyl-modified silicones; phosphoric acid 2-hydroxyethyl methacrylate ester and others that possess phosphate groups for interaction with phosphate-modified silicones, as well as their copolymers and the mixtures of these ionically-modified polymers.

In addition to the non-covalent interactions between silicone ionomers and polymers, covalent bond formation between the silicone ionomers and the polymer can occur via chemical crosslinking reactions between the reactive functionalities on the silicone ionomer and the reactive groups on polymer, such that the final composition is a crosslinked copolymer network In a preferred embodiment, the covalent bonds are formed via condensation reactions between two or more functional groups, with the liberation of a small molecule such as water, carbon dioxide, methane, alcohols, bases (e.g., ammonia) oximes, or acids (e.g. HCl, $CH_3COOH$).

While it is most preferable that the silicone ionomer and the network forming polymer be largely compatible with one another, the compatibility can also be artificially induced via the use of suitable techniques comprising the use of surfactants, co-surfactants, emulsifiers, solvents, co-solvents and compatibilizers; physical techniques such as use of high shear, rotational motion, sonic energy, vibrations, turbulence, heat or cryogenic techniques; use of actinic radiation or suitable combinations thereof as are known to those skilled in the art The polymers of the present composition may either be thermoplastics or thermosets. Examples of such crosslinkable, reactive polymers include but are not limited to: ethylenically unsaturated monomers and prepolymers, vinyl functional monomers and prepolymers, hydride functional monomers and prepolymers, hydroxyl functional monomers and pre-polymers, derivatives of (meth)acrylic acid and its esters, polyurethanes, polyethers, polyesters, polylactones, polylactides, polyglycolides, polyacids, polyamides, polyethylene, polypropylene, poly(alkene oxides) such as polyethylene oxide, polypropylene oxide, polybutadiene, polybutylene, polyacrylonitrile, polyvinyl chloride, polystyrene, polysulfone, PEEK, polycarbonate, polyepoxides, fluoropolymers such as PTFE, polyvinyldifluoride, synthetic and natural rubber, phenol formaldehyde, melamine formaldehyde, urea formaldehyde, polymers of natural or semi-synthetic origin such as polysaccharides, cellulose, proteins, polypeptides, poly(amino acids), organosilicon polymers such as but not limited to polysiloxanes, polysilicates, polysilsesquioxanes, polysilanes, ionically modified versions of the above, and various isomers and co-polymers of the above polymers.

In yet another embodiment of the invention, the reactive polymer component can comprise of 0 to 99 parts by weight acrylate derivatives.

Typical acrylate derivatives are the condensation products of acrylic acid, alkyl-substituted acrylic acid and various alcohols, amines or similar nucleophilic substituents, and are specifically selected from the group consisting of any monomeric or oligomeric molecule possessing one or more acrylic, methacrylic, ethacrylic groups that can be co-cured with the composition. Preferably, the acrylate derivatives are selected from the group consisting of methacrylate, butylacrylate, propylacrylate, N,N-dimethylacrylamide, methacrylic acid, N-isopropyl acrylamide, dimethylaminoethyl methacrylate, 2-hydroxy-ethyl-methacrylate (HEMA), N-vinylpyrrolidone, and methacrylic acid, 3-[tris(trimethylsiloxy)silyl]propyl methacrylate, acrylate and methacrylate functional carbosilane molecules, hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, difunctional oligofunctional urethane acrylates, tetraacrylate monomer, polyester acrylate oligomers, and combinations thereof.

C. Auxiliary Components
i. Polymerization Aids

Apart from the silicone ionomers and the polymers, several other substances are included as parts of the invention, and are used either as an aid either to obtain the final composition or as property enhancers for the final composition. As an example, such substances can be used for optimal curing of the composition to provide the right mix of physical-chemical properties in the final invention. Examples of such polymerization aids include: catalysts, crosslinkers, chain extenders, polymerization initiators, chain terminators, mixing aids, compatibilizers, surfactants and oxygen scavengers. These agents can be selected and used judiciously depending upon the specifications of the reaction chemistries involved, by those skilled in the relevant art. Some non-limiting examples of these various polymerization aids for specific reactive chemistry scenarios will now be provided.

When the reacting system involves hydrosilylation as the mechanism of polymerization, precious-metal based catalysts are used. catalyst can be exemplified by platinum catalyst such as platinic chloride, chloroplatinic acid, bis(acetylacetonato)platinum, and by platinum group metal catalysts such as palladium and rhodium catalysts as well as iron based catalysts. Preferably, the catalyst is platinum, and even more preferably, the platinum catalyst is present in a soluble complex form: ($\eta^5$-Cyclopentadienyl)trialkylplatinum complexes, Pt triazenido complex, $Pt(PPh_3)_2Cl_2$ and the type can be used for the photochemically induced addition reaction. The catalyst may be present as homogenous or heterogeneous form.

When the reacting system involves free-radical polymerization, typically a thermal or photo-activated reaction initiator is utilized and is selected from but not limited to the carbonyl compounds such as benzoin, benzoin methyl ether, benzoin ethyl ether, benzoin propyl ether, benzoin-n-butyl ether, benzoin isobutyl ether, acetoin, butyroin, toluoin, benzil, benzophenone, para methoxybenzophenone, 2,2-diethoxyacetophenone, alpha-alpha-dimethoxy-alpha-phenylacetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one; sulfur compounds such as tetramethylthiuram monosulfide and tetramethylthiuram disulfide; azo compounds such as azobisisobutyronitrile and azobis-2,4-dimethylvaleronitrile; and organic peroxide compounds such as benzoyl peroxide, dicumyl peroxide, methyl ethyl ketone peroxide, acetone peroxide, and di-tert-butyl peroxide, thioxanthone photoinitiators such as 7-chlorothioxanthone, 2,4-diethylthioxanthone and 2,4-diisopropylthioxanthone; and acylophosphine oxide photoinitiators. In addition to those above, commercially available proprietary free radical initiator compositions such as but not limited to Irgacure (Ciba Speciality Chemicals), VAZO (DuPont), Darcure etc. can also be used to the same effect.

ii. Functional Additives

In addition, these other components can be present as additives to further enhance the performance of the composition and may include plasticizers, tackifiers, pigments, colorants, mold release agents, UV absorbers, antioxidants, adhesion promoters as well as various active agents of value that can be retained within or on the surface of the cured polymer matrix or released without at a controlled rate to deliver a desired effect. In a healthcare-related application, examples of such active agents include bioactives, anti-acne agents, anti-ageing agents, anti-caries agents, anti-fungal agents, anti-microbial agents, anti-oxidants, anti-cancer, anti-viral, anti-inflammatory, anti-coagulants, hemostatic agents, blood pressure regulators, exfoliants, hormones, hormone analogs, enzymes, medicinal compounds, biocides, external analgesics, oral care agents, oral care drugs, oxidizing agents, reducing agents, skin protectants, essential oils, insect repellents, UV light absorbing agents, solar filters, pigments, hydrating agents, skin permeation enhancers, vitamins and their combinations thereof.

For a personal care related application, the active agents include surfactants, emulsifiers, solvents, emollients, moisturizers, humectants, pigments, colorants, fragrances, biocides, preservatives, chelating agents, antioxidants, anti-microbial agents, anti-fungal agents, antiperspirant agents, exfoliants, permeation enhancers, hormones, enzymes, medicinal compounds, vitamins, alpha-hydroxy acids, beta-hydroxy acids, retinols, niacinamide, skin lightening agents, salts, electrolytes, alcohols, polyols, absorbing agents for ultraviolet radiation, botanical extracts, organic oils, waxes, thickening agents, particulate fillers, silicones, clays, plasticizers, occlusives, sensory enhancers, esters, resins, film formers, film forming emulsifiers, high refractive index materials and their combinations thereof.

The functional additives may be dissolved or dispersed in the final composition. In one form of the invention, the functional additives are present in ionic form which can be bound to the ionic moieties present on the silicone ionomers or on the forming polymer, and are released in a sustained manner through an ion-exchange mechanism with the surrounding environment.

iii. Fillers

The mechanical, thermal or electrical properties of the final cured compositions may further be improved by the incorporation of suitable reinforcing and non-reinforcing fillers within the matrix. The fillers can be present at a loading of 0% to 99% of the total weight of the final composition. Preferably, the fillers are present at a loading of 1% to 50% of the total weight of the composition. Examples of suitable filler materials include but are not limited to: silicone resins, silica, nanosilica, titanium, ceria, fumed silica, particulate forms of oxides of titanium, cerium, aluminum, zirconium and other metals and metalloids; boron nitride, carbon black, graphite, graphene, carbon nanotubes, glass fibers, polysachharide particles, protein particles, fibers of natural, semisynthetic or synthetic origin, inorganic fillers such as talc, carborundum, mica, mineral clays, and suitable combinations thereof.

Polymer Composite Composition

The polymer composite form of the silicone adhesive composition can be obtained by various methods known to those skilled in the art.

In one instance, the composition can be obtained via the polymerization of the monomers or prepolymers or their mixtures in presence of the silicone ionomers.

In another instance, the composition can be obtained via the polymerization of the functional form of the silicone ionomer in presence of the polymer In an even another instance, the polymer composition is obtainable by the simultaneous or sequential polymerization of the silicone ionomer as well as the monomers or prepolymers or their mixtures In yet another instance, the polymer composite composition is obtained by the physical or reactive blending of the silicone ionomer and the polymer. Polymer composite composition can also be obtained via covalent bond formation between the silicone ionomers, and the polymer.

In yet another embodiment, the silicone ionomers of the composition and the reactive polymers undergo chemical crosslinking with one another and with themselves through a condensation reaction, via liberation of small molecules such as water, carbon dioxide, methane, alcohols, oximes, ketones, bases (e.g. ammonia) and acids (e.g. HCl, $CH_3COOH$), preferably in the presence of acid-base catalysts such as ammonia, potassium hydroxide, alkylamines, metal salts such as tin octanoate, dibutyl tin di-laurate (DBTDL), fatty acid salts of titanium, zirconium, iron and other transition metals.

In such an embodiment, the silicone ionomers are those as represented by formula (I) above, with $R^1$ to $R^{24}$ as defined above and additionally, $R^7$, $R^{14}$ and $R^{18}$ are a monovalent hydrocarbon radical selected from the group of the formulae (XI) to (XIII):

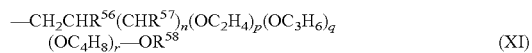

$$-CH_2CHR^{56}(CHR^{57})_n(OC_2H_4)_p(OC_3H_6)_q(OC_4H_8)_r-OR^{58} \quad (XI)$$

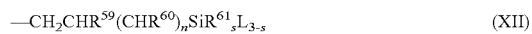

$$-CH_2CHR^{59}(CHR^{60})_n SiR^{61}_s L_{3-s} \quad (XII)$$

$$-CH_2CHR^{62}(CHR^{63})_c-B-Z \quad (XIII)$$

where $R^{56}$ to $R^{63}$ are as defined above.

where L is a monovalent radical independently selected from halogen, $OR^{64}$, $-CO(O)R^{65}$, $-N=CR^{66}_2$, $-NCO$, $-NC(O)R^{67}$, $-C\equiv N$, $-N\equiv N$ and $-NR^{68}_2$ where $R^{64}$, $R^{65}$, $R^{66}$, $R^{67}$, $R^{68}$ are independently selected from a group consisting of hydrogen and alkyl, alkenyl, cycloalkyl and aryl containing from 1 to about 60 carbon atoms, specifically from 1 to about 20 carbon atoms, more specifically from 1 to about 8 carbon atoms;

where Z is a monovalent radical independently selected from halogen, $OR^{64A}$, $-CO(O)R^{65}$, $-N=CR^{66}_2$, $-NCO$, $-NC(O)R^{67}$, $-C\equiv N$, $-N\equiv N$ and $-NR^{68A}_2$ where $R^{65}$, $R^{66}$, $R^{67}$ are independently selected from a group consisting of hydrogen and alkyl, alkenyl, cycloalkyl and aryl containing from 1 to about 60 carbon atoms, specifically from 1 to about 20 carbon atoms, more specifically from 1 to about 8 carbon atoms and $R^{64A}$ is hydrogen or selected from a group consisting of alkyl, alkenyl, cycloalkyl and aryl containing from 1 to about 60 carbon atoms, specifically from 1 to about 20 carbon atoms, more specifically from 1 to about 8 carbon atoms, and where Y and B are divalent radical selected from a linear, branched, cyclic hydrocarbon radical or aralkyl radical containing from 1 to about 60 carbon atoms, specifically from 1 to about 20 carbon atoms, more specifically from 1 to about 8 carbon atoms, and may contain heteroatom;

where $R^{69}$ is hydrogen or a monovalent alkyl radical with 2 to about 20 carbon atoms or an acyl group, where the subscript n is zero or positive integer and has a value in the range of 0 to about 60, where subscript o is positive integer and has a value in the range of 1 to about 60, where subscripts p, q and r are zero or positive and independently selected from a value in the range of 0 to about 100, subject to the limitation of $p+q+r \geq 1$ and s is zero or positive integer and has a value of 0 to about 2.

In such an instance, the condensation reaction is typically catalyzed by acid-base catalysts such as organotin based catalyst such as dibutyl tin dilaurate, tin octanoate and other alkyltin compounds; acid-base salts of other metals such as titanium, iron, zinc, aluminum can also be considered.

The final physical nature of the composition is not the basis of the present invention, and is dependent upon a variety of factors, including the desired final application of the composition. However, the composition is preferably a film forming composition that could be a solid or semi-solid in its final form.

Applications

As described earlier, the invention in its various forms can be utilized in form of numerous applications, in healthcare (as contact lenses, ocular implants, hydrogels, drug delivery devices, bioinserts, wound dressing patches, wound healing patches, iontophoretic devices, tissue engineering scaffolds, antimicrobial devices and prostheses), personal care (creams, ointments, lotions, shampoos, conditioners) in construction and automotive industries (as adhesives, sealants, gaskets, topcoats), marine applications (hull coatings, paints for underwater and harbor installations, etc.), in apparel and sporting goods, for textile treatment, in oil and gas, as perm-selective membranes, as fuel-cells, in electronic and electrical applications, and in any other areas where a combination of properties of silicones and other engineering polymers is desired.

A particularly relevant example in healthcare comprises the application of the present invention as hydrogel-type dressings for wound care. The dressings are able to absorb and retain large quantities of water from a highly exudating wound, which prevents excess moisture levels in the wound that can cause maceration of the wound bed. In addition, the hydrogel dressings, when applied in hydrated form, are also able to donate water to a dry, necrotic wound bed.

Hydrogels are typically made out of organic derivatives of acrylic or methacrylic acid, on account of their superabsorbing capability. Such hydrogels lack oxygen permeability, and are difficult to remove from the wound bed, in case of accidental drying. In this case, the dry hydrogels stick to the wound bed and cause trauma upon dressing removal.

The silicone ionomer comprising polymer composite composition of the present invention, in its embodiment as a hydrogel, may not stick to the wound bed upon drying, thereby facilitating atraumatic removal or repositioning of the wound dressing. Additionally, the incorporation of silicones can provide with improved oxygen permeability to the wound bed.

Yet another application of the present invention in the healthcare field is in form of pressure sensitive adhesives for transdermal delivery of drugs.

Silicone-based pressure sensitive adhesives with drugs dissolved or dispersed in the polymer matrix are commonly used devices for transdermal delivery. However, on account of their hydrophobicity and inertness, many hydrophilic drugs are unable to interact with the silicones, and as a result, crystallize in the patch. Due to the ionic nature of silicones used in the present invention, such drugs are better able to interact with the silicones, leading to a modified and desirable release profile Additionally, the water absorbing capability of silicone ionomers implies that a greater portion of the drug is accessible to the body fluids, which translates into a better economic value for the end-user and is also safe for disposal, from a regulatory standpoint.

In addition to the above examples, the polymer composite composition comprising silicone ionomer can be used to harbor and deliver various other agents of therapeutic value, depending upon the end application.

Examples of pharmaceutically active ingredients that can be included within the composition include but are not limited to bioactives, anti-acne agents, anti-ageing agents, anti-caries agents, anti-fungal agents, anti-microbial agents, anti-oxidants, anti-cancer, anti-viral, anti-inflammatory, anti-coagulants, hemostatic agents, exfoliants, hormones, enzymes, medicinal compounds, biocides, external analgesics, oral care agents, oral care drugs, oxidizing agents, reducing agents, skin protectants, essential oils, insect repellents, UV light absorbing agents, solar filters, sun protection agents, pigments, hydrating agents, vitamins and their combinations thereof.

Some non-limiting examples of applications in healthcare that the present composition may find include wound dressings, dressings for scar reduction, drug delivery devices, medical tubing, clinical surfaces, pacemaker leads, pressure sensitive adhesives, wound healing patches, wound management device, medical adhesives, catheters, shunts, valves, stents, transdermal iontophoresis patches, scaffold for tissue engineering, anti-microbial devices, ophthalmic devices, bioinserts, plugs, surgical devices, medical devices, devices for medical storage, childcare products, assisted breathing apparatus, prostheses, reconstructive devices and body implants.

Examples of personal care application of the polymer composition include one or more deodorants, antiperspirants, antiperspirant/deodorants, sticks and roll-on products, skin lotions, moisturizers, toners, cleansing products, styling gels, hair dyes, hair color products, hair straighteners, nail polish, nail polish remover, sunscreen, anti-aging products, lipsticks, foundations, face powders, eye liners, eye shadows, blushes, makeup, massacres, moisturizing preparations, foundations, body and hand preparations, skin care preparations, face and neck preparations, fragrance preparations, soft focus applications, night and day skin care preparations, tanning preparations, hand liquids, non-woven applications for personal care, baby lotions facial cleansing products, hair cuticle coats, personal care rinse-off products, gels, foam baths, scrubbing cleansers, controlled-release personal care products, hair conditioning mists, skin care moisturizing mists, skin wipes, pore skin wipes, pore cleaners, blemish reducers, skin exfoliators, skin desquamation enhancers, skin towelettes and cloths, depilatory preparations, personal care lubricants, nail coloring preparations, drug delivery systems for topical application of medicinal compositions that are to be applied to the skin and combinations thereof.

EXAMPLES

Example 1

Example 1a

Sulfonic Acid Functionalized Tetramethylcyclotetrasiloxane

A three necked 500 mL flask was charged with 70.08 g (60.0 mmol) alpha-methylstyrene and $10.0 \times 10^{-4}$ g platinum catalyst. The temperature of the resulting mixture was brought to 115 degrees Celsius, then 30.0 g (120.5 mmol) of 1,3,5,7-tetramethylcyclotetrasiloxane was added drop wise and continually stirred. The progress of the reaction mixture was monitored by $^1$H NMR. After 12 h of the reaction, complete conversion of silicone hydride was indicated by the NMR. Then, the reaction mixture was vacuum stripped at 150 degrees Celsius for 2 h to remove unreacted alpha-methylstyrene which gave 80.5 g aralkylene substituted cyclotetrasiloxane. (Yield: 95%).

To 14.24 g (20.0 mmol) of the above aralkylene substituted cyclotetrasiloxane, 18.64 g (160.0 mmol) of chlorosulfonic acid dissolved in 4.0 mL dichloromethane was added drop wise through a period of 30 minutes while the mixture being stirred at room temperature. The resulting mixture was continually stirred for an additional 30 minutes. The completion of the reaction was indicated by $^1$H NMR where complete sulfonation of the aromatic ring was indicated by the disappearance of para-substituted aromatic proton peak. The vacuum stripping of the reaction mixture at low pressure afforded 20.6 g of the sulfonic acid functional cyclotetrasiloxane as brown viscous gum. $^1$H NMR and $^{29}$Si NMR confirmed the product formation.

Example 1b

Sulfonate Functional Polyorganosiloxane Bearing Terminal Vinyl Groups

To 5.7 g (8.0 mmol) of the sulfonic acid functional cyclotetrasiloxane obtained in example 1a, 474.7 g (1600.0 mmol) of octamethyltetracyclosiloxane and 1.48 g (8.0 mmol) of 1,1,3,3-tetramethyl-1,3-divinyldisiloxane were added and continually stirred at room temperature. After reaching equilibrium of ~87 wt % of the linear siloxanes, the reaction mixture was neutralized using 10.0 g (128.0 mmol) of moistened sodium bicarbonate at 70 degrees Celsius. The vacuum stripping of the reaction mixture at low pressure afforded 411.0 g of the product as viscous gum. The NMR analysis of the product indicated that the polymer is vinyl-terminated sulfonated polydimethylsiloxane.

Example 1c

Sulfonate Functional Polyorganosiloxane Bearing Terminal Methyl Groups

To the sulfonated cyclotetrasiloxane obtained in example 1a, 112.7 g (380.0 mmol) of octamethyltetracyclosiloxane ($D_4$) and 0.324 g (2.0 mmol) of hexamethyldisiloxane (MM) were added and continually stirred at room temperature. After 6 h of reaction, an equilibrium of ~82% was indicated by $^{29}$Si NMR. At this point, hexane (200 mL) and 161 g sodium bicarbonate were added to the mixture and continue to stir for 3 h, when the analysis of the reaction mixture with pH paper indicated the complete neutralization of the sulfonic acid, the reaction mixture was filtered and the filtrate was vacuum stripped at 30 mmHg/70 degree Celsius, when the sulfonated polysiloxane was obtained as white rubbery solid (85.0 g). NMR analysis confirmed the product formation.

Example 1d

Sulfonate Functional Polyorganosiloxane Bearing Terminal Methyl Groups

To the sulfonated cyclotetrasiloxane obtained in example 1a, 112.7 g (380.0 mmol) of octamethyltetracyclosiloxane ($D_4$) and 0.162 g (1.0 mmol) of hexamethyldisiloxane (MM) were added and continually stirred at room temperature. After 6 h of reaction, an equilibrium of ~82% was indicated by 29Si NMR. At this point, hexane (200 mL) and 161 g sodium bicarbonate were added to the mixture and continue to stir for 3 h, when the analysis of the reaction mixture with pH paper indicated the complete neutralization of the sulfonic acid, the reaction mixture was filtered and the filtrate was vacuum stripped at 30 mmHg/70 degree Celsius, when the sulfonated polysiloxane was obtained as white waxy solid (80.0 g). NMR confirmed the product formation.

Example 1e

Sulfonate Functional Polyorganosiloxane Bearing Terminal Hydroxyl Groups

To the sulfonic acid functional cyclotetrasiloxane 5.7 g (8.0 mmol) obtained in example 1a, 474.7 g (1600.0 mmol) of octamethyltetracyclosiloxane and 18.75 g g (0.62 mmol) of hydroxyl terminated polydimethylsiloxane (Momentive grade) were added and continually stirred at room temperature. After reaching equilibrium of ~87 wt % of the linear siloxanes, the reaction mixture was neutralized using 10.0 g (128.0 mmol) of moistened sodium bicarbonate at 70 degrees Celsius. The vacuum stripping of the reaction mixture at low pressure afforded 411.0 g of the product as viscous gum. The NMR analyses confirmed the product formation.

Example 2

Example 2a

Synthesis of Sulfonated Disiloxane

A three necked 500 mL flask was charged with 18.16 g (154.0 mmol) of alpha-methylstyrene and 27.2×10-5 g platinum catalyst. The temperature of the resulting mixture was brought to 115 degrees Celsius, then 9.40 g (70.0 mmol) of 1,1,3,3 tetramethyldisiloxane was added drop wise and continually stirred until completion of the hydrosilylation reaction. The complete hydrosilylation was indicated by the disappearance of silicone hydride peak in NMR. The resulting mixture was vacuum stripped to remove unreacted alpha-methylstyrene by placing on an oil bath at 150 degrees Celsius for 2 h which gave 23.2 g aralkylene substituted disiloxane.

To this aralkylene substituted disiloxane (23.2 g, 62.4 mmol), 29.6 g (252.8 mmol) of chlorosulfonic acid was added drop wise through a period of 30 minutes while the mixture being stirred at room temperature. The resulting mixture was continually stirred for additional 30 minutes. The completion of the reaction was determined by $^1$H NMR where total sulfonation of the aromatic ring was indicated by the disappearance of para-substituted aromatic proton peak. The vacuum stripping of the reaction mixture at low pressure afforded 33.0 g of the sulfonated disiloxane as brown viscous oil.

Example 2b

Synthesis of Sulfonated Endcapped Silicone Ionomers

To the sulfonic acid functional disiloxane 8.38 g (15.8 mmol) obtained in as above, 468.63 g (1580.0 mmol) of octamethyltetracyclosiloxane was added and continually stirred at room temperature. After reaching an equilibrium of ~87 wt % of the linear siloxanes, the reaction mixture was neutralized using 10.6 (126.0 mmol) of moistened sodium bicarbonate at 70 degrees Celsius. The vacuum stripping of the reaction mixture at low pressure afforded 541.4 g of the product as viscous gum. The NMR analysis of the product indicated that the polymer was a salt of terminal sulfonic acid functional polydimethylsiloxane. The polymer had a viscosity of 26.5 Pa·s at a shear rate of 10 rad/s when measured by a HAAKE Rheometer at 20 degrees Celsius.

Example 2c

Synthesis of Sulfonated Silicone Ionomer with Pendant PEG Groups

A three necked 500 mL flask was charged with 234.0 g (520.0 mmol) of allylpolyethylene glycol and 20.0×10$^{-4}$ g platinum catalyst. The temperature of the resulting mixture was brought to 100 degrees Celsius, then 24.0 g (100.0 mmol)

of 1,3,5,7-tetramethylcyclotetrasiloxane was added drop wise and continually stirred. The progress of the reaction mixture was monitored by NMR. After 12 h of the reaction, complete conversion of silicone hydride was indicated by NMR. To 128.9 g (63.2 mmol) of the above PEG functionalized tetracyclosiloxane were added 37.4 g (126.4 mmol) of octamethyltetracyclosiloxane and 40.0 g (63.2 mmol) of sulfonated disiloxane (from Example 2a). The reaction mixture was placed into an oil bath and continually stirred at room temperature. After reaching an equilibrium of ~87 wt % of the linear siloxanes, the reaction mixture was neutralized using 42.47 g (505.0 mmol) of moistened sodium bicarbonate at 70 degrees Celsius. The vacuum stripping of the reaction mixture at low pressure afforded the product as viscous liquid.

Example 3

Synthesis of Calcium Carboxylate Functional Polyorganosiloxane

A 500 ml three necked round bottom flask was charged with 650 ml water and 184 g (3.27 M) of potassium hydroxide. 164.2 g (1 M) of eugenol was added and the solution was heated to 90 degrees Celsius and stirred till the solution become clear. 154.34 g (1.6 M) of chloroacetic acid was dissolved in 320 ml water and added to above solution at 90-95 degrees Celsius in 4 h. The solution was further stirred for ~2 h at 90-95 degrees Celsius, cooled to 50 degrees Celsius, acidified with dilute HCl and filtered the precipitate to give the carboxylic acid functional eugenol. A 2 L round bottom flask was charged with 177.76 g (0.8 M) of the above product, 136 g (0.8 M) of iodopropane and 148 g (0.8 M) of tributylamine was added to 1000 ml toluene. The solution was heated to 90 degrees Celsius and stirred for 6 h and cooled to room temperature and the precipitate was filtered. The filtrate was stripped off the solvent to get the propyl ester of carboxylated eugenol. A 500 ml three necked round bottom flask was charged with 185 g (0.7 M) of the above compound, 46.9 g (0.35 M) of tetramethyldisiloxane and 0.05 g Pt Karstedt's catalyst. The solution was stirred for 120 h at 68-70 degrees Celsius to get the carboxylate ester disiloxane derivative. A 500 ml three necked round bottom flask was charged with 66 g above compound and 250 ml ethyl alcohol. Aqueous sodium hydroxide solution (12 g sodium hydroxide in 50 ml water) was added and the solution was stirred for 3 h at 70 degrees Celsius to give the carboxylic acid functional tetramethyldisiloxane derivative. A 500 ml three necked round bottom flask was charged with 20 g (0.034 M) of above compound, 504 g (1.7 M) of octamethylcyclotetrasiloxane and 8 g acidic ion exchange resin. The solution was stirred for 40 h at 70-75 degrees Celsius to give the carboxylic acid functional polydimethylsiloxane. A 500 ml three necked round bottom flask was charged with 152.96 g (0.01 M) of above compound and 0.56 g (0.01 M) of calcium oxide. The solution was stirred for 16 h at 50-55 degrees Celsius to give calcium carboxylate functional polyorganosiloxane.

Example 4

Polymer Composite of Silicone Ionomer and Polysilicate

The vinyl-terminated, pendant sulfonated silicone ionomer (Example 1b) was mixed with tetraethyl orthosilicate (TEOS) the content varying from 1% to 10%. The two compounds were mixed thoroughly in a high-speed mixer (2200 RPM) and formed a uniform blend. To this blend, the catalyst dibutyl tin dialaurate (DBTDL) was added at 0.5% w/w and the mixture was homogenized again. Following the mixing, the blend was cast as 200 micron films on a polyethylene sheet using an automated draw-down machine, and allowed to cure overnight.

Upon curing, translucent films were obtained, which had varying degrees of tack, as determined by finger-touch. The level of tackiness decreased with increasing TEOS content. The blend with control vinyl PDMS (vinyl terminated U10 polymer, Momentive Performance Materials) in the same formulation as above did not cure to form a film, indicating the contribution of ionic aggregation to film mechanical strength.

Example 5

Polymer Composite Based Pressure Sensitive Adhesive from End-Sulfonated Polydiorganosiloxane and Condensed Tetraethylorthosilicate The end-sulfonated silicone ionomer (Example 2b) was mixed with tetraethyl orthosilicate (TEOS) with TEOS content varying from 5 wt % to 25 wt %. A suitable solvent (ethyl acetate, hexane or toluene) was added to increase processability. The components were mixed thoroughly in a high-speed mixer (2200 RPM) and formed a uniform blend. To this blend, the catalyst dibutyl tin dialaurate (DBTDL) was added at concentrations ranging from 0.2 to 0.5 wt % of total solids and the mixture was homogenized again. Following the mixing, the blend was cast either as 200 micron films on a polyethylene sheet using an automated draw-down machine, or poured into Teflon molds. The films were cured overnight and the solvent was evaporated. Upon curing, translucent films were obtained, which had varying degrees of tack, as determined by finger-touch. The level of tackiness decreased with increasing TEOS content. The films with 25% initial TEOS loading did not demonstrate any tack. Further, a control vinyl-modified siloxane (vinyl terminated U10 polymer, Momentive Performance Materials) in the same formulation as above did not cure to form a film, indicating the contribution of ionic aggregation to film mechanical strength.

Example 6

Silver Release from Polymer Composite Based Pressure Sensitive Adhesive of End-Sulfonated Polydiorganosiloxane and Condensed Tetraethylorthosilicate Polymer composite of sodium salt of end-sulfonated polydiorganosiloxane were prepared as described in Example 5, using a varying initial TEOS loading of 5 wt % to 25 wt % and with DBTDL loading of 0.2%. The films were contacted with 1.1 wt % of silver nitrate solution prepared in $HNO_3$-acidified DI water. The films were immersed in the silver nitrate solution for 48 h, washed with copious amounts of DI water and dried for 24 h at 50 degree Celsius. The films were immersed in 0.1 M $NaNO_3$ solution and aliquots were removed at predetermined time intervals. The silver ion content of the aliquots was analyzed by ICP (Inductively Coupled Plasma)

spectroscopy. The cumulative amount of releases of silver ions as a function of time is as shown in FIG. 1.

Example 7

Figure 2:
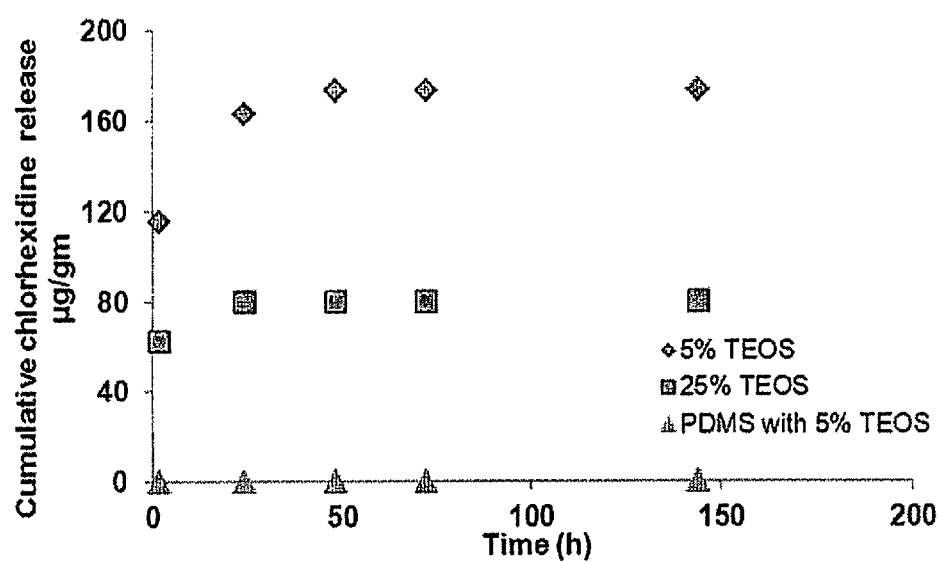
FIG. 2 is a graph showing cumulative release of chlorhexidine from polymer composite PSA containing sulfonated silicone ionomer.

Chlorhexidine Release from Pressure Sensitive Adhesive Comprising End-Sulfonated Polydiorganosiloxane and Condensed Tetraethylorthosilicate Polymer composites of sodium salt of end-sulfonated polydiorganosiloxane were prepared as described in example 5, using a varying initial TEOS loading of 5% and 25% and with DBTDL loading of 0.5 wt %. of total solids. The films were contacted with a solution of 20% chlorhexidine digluconate, during which the sodium ions from the polydiorganosiloxane are replaced with cationic chlorhexidine (CHX). As a control, silanol-terminated PDMS film, crosslinked using 5% TEOS was used. The control film lacked any anionic groups that would potentially bind with the CHX. The films were immersed for 48 h, washed with copious amounts of DI water and dried for 24 h at 50 degrees Celsius. The films were immersed in 50 mM sodium acetate buffer, pH 5.5, whereby the CHX was re-exchanged with Na+ ions and released into the medium. The CHX content was analyzed by liquid chromatography. The cumulative amount of releases of CHX as a function of time is as shown. As can be seen in FIG. 2, the non-ionic PDMS film did not bind and release any amount of CHX.

Example 8

Rheological Characterization of Pressure Sensitive Adhesives from Pendant-Sulfonated Polydiorganosiloxane and Condensed Tetraethyl Orthosilicate Polymer composite pressure sensitive adhesives (PSA) were prepared as described in Example 4, with TEOS content varying from 5 wt % to 25 wt % and at a catalyst loading of 0.5 wt %. The visco-elastic properties of the adhesive sheets (1-1.5 mm thickness) were tested using a Haake-Rheostress oscillatory rheometer using a cone-and-plate attachment (1° angle) and a gap width of 0.052 mm optimized for this testing geometry. Each adhesive sample was first subjected to an increasing oscillatory stress ranging from 100 to 10,000 Pa at a fixed frequency (1 Hz) to identify the linear viscoelastic region (LVR). Afterwards, the samples were subjected to a suitable oscillatory stress within the LVR but the frequency was varied from 0.01 to 100 Hz. In each case, the storage (G') and loss moduli (G'') were measured as a function of applied stress or frequency. Based on these measurements, it was determined whether the pressure sensitive adhesives satisfy the modified Chu criteria for viscoelasticity, which are G' (0.1 Hz) between $0.5 \times 10^4$ to $5 \times 10^4$ Pa and the ratio G'(100 Hz)/G'(0.1 Hz) lies between 5 and 300. {Ref: Ho and Dodou, Int. J Pharmaceutics 333 (2007) pp 24-33}.

Figure 3A:
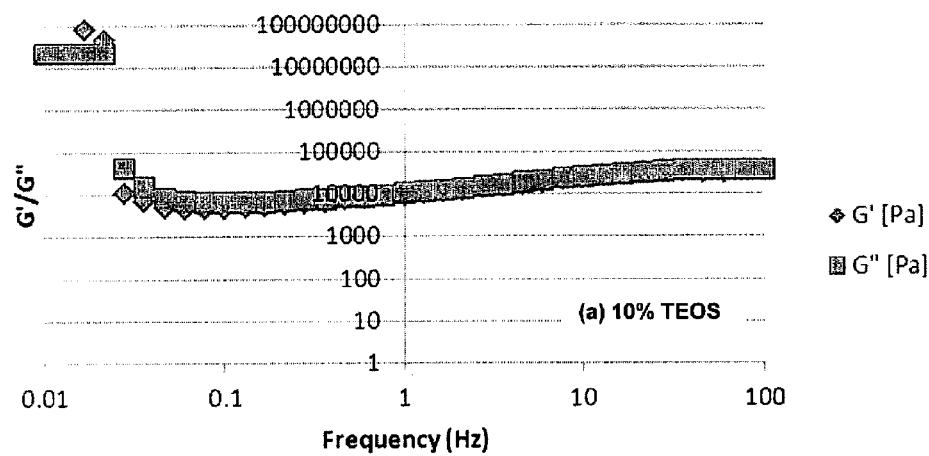
FIGS. 3(a) and 3(b) are graphs showing the rheological characterization of polymer composite PSA containing sulfonated silicone ionomer.
Figure 3B:
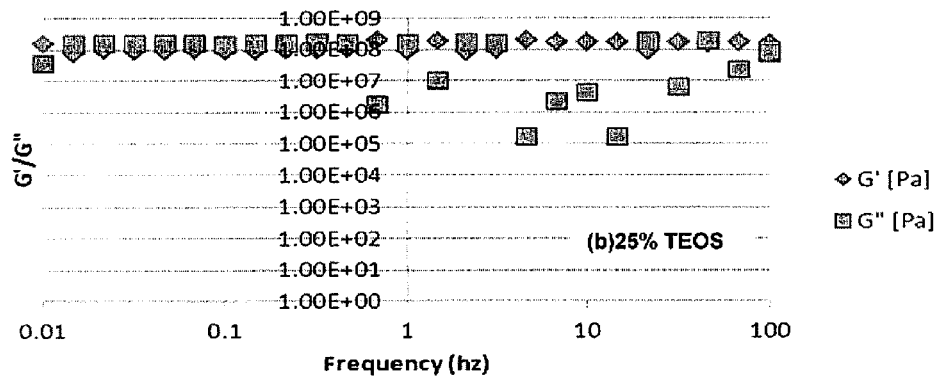

The results of the viscoelastic measurement (frequency sweep) are shown in FIG. 3. It can be seen that, from these graphs, the 25 wt % TEOS adhesive formulation does not meet the Chu criteria, whereas the 10 wt % TEOS formulation marginally satisfies the viscoelastic requirements of a PSA applicable for transdermal delivery of active agents.

Example 9

Polymer Composite Based PSA Loaded with Ibuprofen

Figure 4:
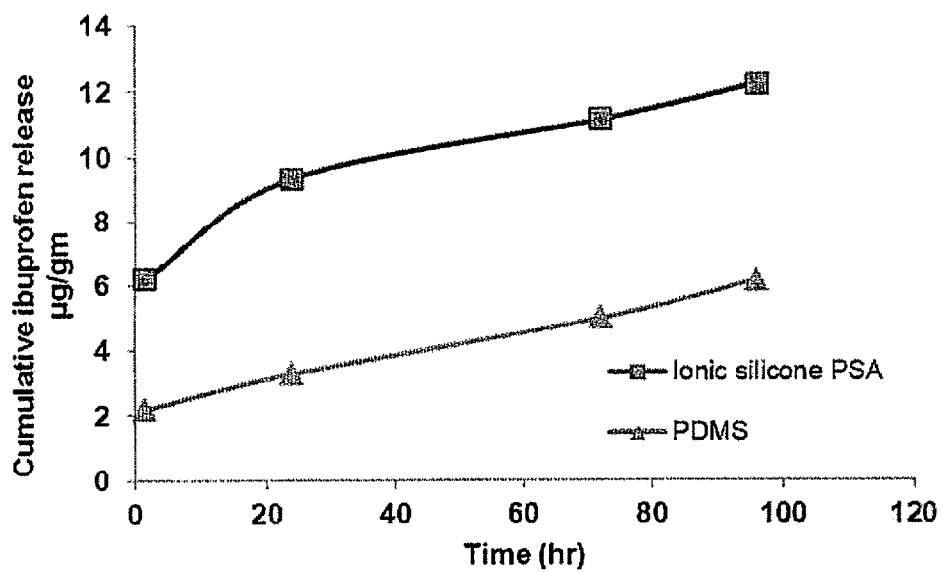
FIG. 4 is a graph showing the cumulative release of ibuprofen from polymer composite PSA containing sulfonated silicone ionomer.

Sustained release of the model drug Ibuprofen was studied from pressure sensitive adhesives (PSA) were prepared as described in Example 4, with 5% TEOS content and a catalyst loading of 0.5 wt %. The drug ibuprofen was incorporated by dissolving the drug in the solvent (toluene) used for mixing the ionic polydiorganosiloxane, crosslinker and catalyst. A 1 wt % loading of drug based on total solids was aimed. Upon mixing, the drug-containing mixtures were poured in Teflon® molds and allowed to cure overnight. A silanol-PDMS film crosslinked with 5% TEOS was also loaded with 1% ibuprofen and served as a control. The resulting films were cut in samples, weighed and immersed in a mixture of 25% IPA/75% DI water to measure the drug release rate. Aliquots were removed at pre-determined time intervals and Ibuprofen content was analyzed using HPLC. It was observed that there was a marked difference in the absolute amount of Ibuprofen release from the silicone ionomer-containing formulation, and that from the PDMS-containing film (FIG. 4).

The difference in release rate of Ibuprofen from the silicone ionomer formulation could be due to the difference in the interaction of the drug and the silicone ionomer or control PDMS.

Figure 5A:
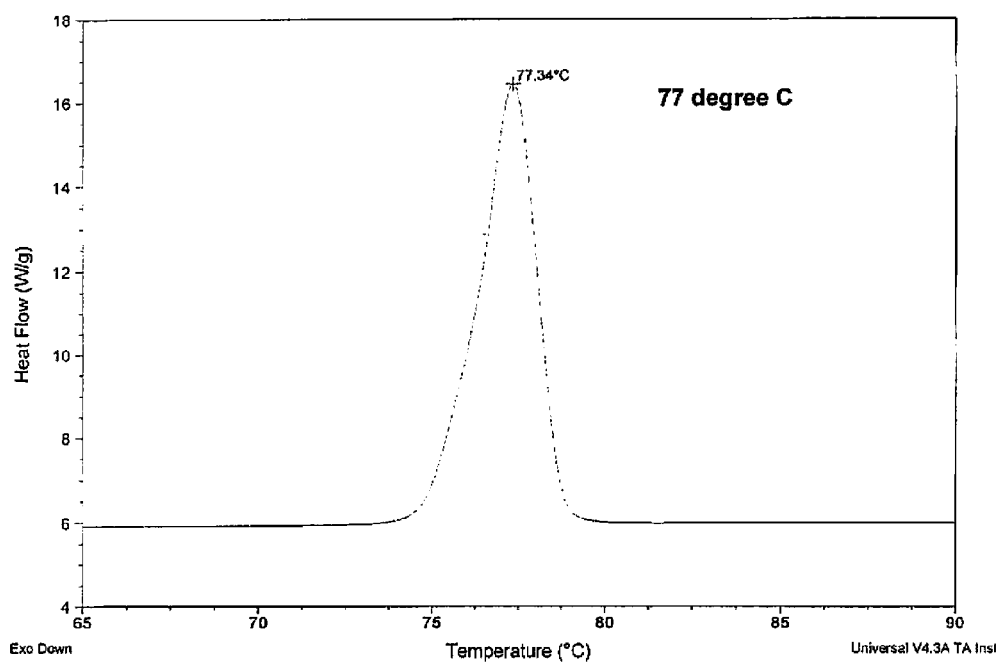
FIGS. 5(a), 5(b) and 5(c) are differential scanning calorimetry thermograms of (a) ibuprofen solid drug, (b) ibuprofen loaded PDMS film and (c) ibuprofen loaded polymer composite PSA containing sulfonated silicone ionomer, respectively.
Figure 5B:
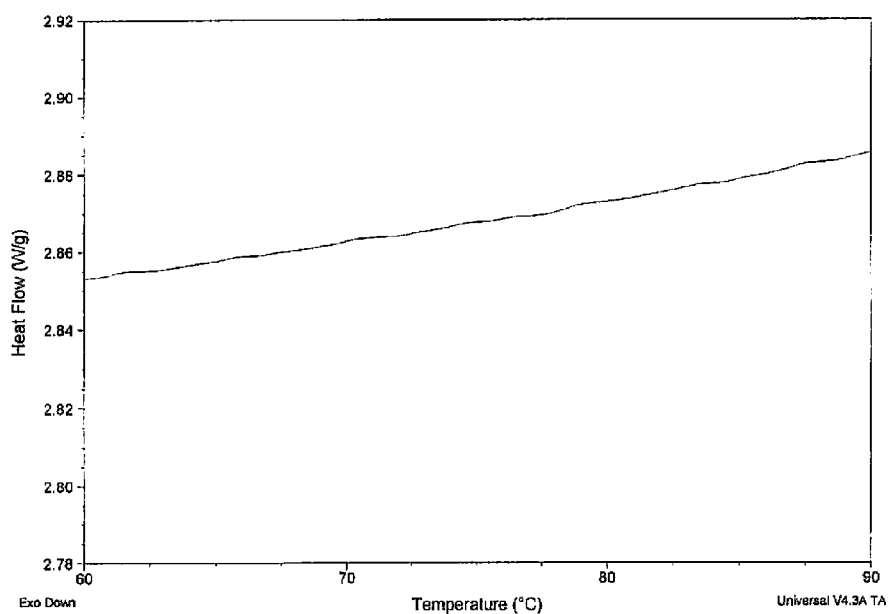
Figure 5C:
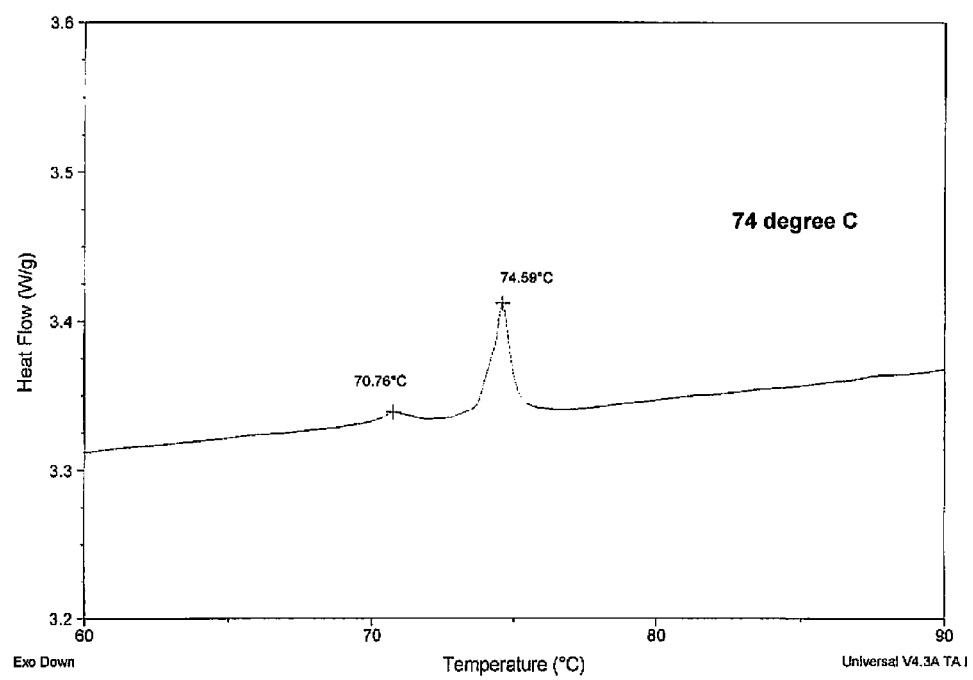

To further study the interaction, the drug containing samples were analyzed via DSC using a TA Instruments Differential Scanning calorimeter. The silicone ionomer and PDMS-based samples containing ibuprofen, as well as pure drug were heated from room temperature to 200 degrees Celsius at a rate of 5 degrees Celsius/min. The drug melting point, Tm was identified at 77 degrees Celsius. For the drug containing silicone ionomer based PSA, the melting transition was not seen in the range tested, whereas for the PDMS-based film, a melting peak was observed at 74 degrees Celsius. This indicates that in the silicone ionomer environment, the drug is either dissolved in the solid polymer, or remains in amorphous form but the drug crystallizes or precipitates in the PDMS environment (FIG. 5). This evidence of differential interactions could explain the difference in ibuprofen release through these systems.

Example 10

Polymer Composite of Sulfonated Silicone Ionomer and Butyl Acrylate

End-sulfonated, unfunctionalized silicone ionomer (Example 2b), sulfonation content 0.06 mmol/g was blended with butyl acrylate monomer, at a 10% loading. To this blend, a bi-functional acrylate crosslinker (e.g., ethylene glycol dimethyl acrylate) and a UV-sensitive initiator (Irgacure) was added. The mixture was poured in a sealed PET mold and cured under UV-light (105 mW/cm$^2$ intensity) for two minutes. The mixture cured to a soft, translucent film.

Example 11

Polymer Composite of Pendant-Sulfonated Silicone Ionomer and 2-acrylamido-2-methylpropanesulfonic acid A 25% stock solution of pendant sulfonated silicone ionomer (Example 1c) in 70% water-30% isopropanol mixture was prepared by overnight agitation. A 50% w/v stock solution of 2-acrylamido-2 methylpropanesulfonic acid (AMPS) was prepared in the same solvent, and neutralized by adding an equimolar amount of solid NaOH powder. The crosslinker N,N methylene bisacrylamide (MBA), at a concentration ranging from 0.5% to 1% (w/w AMPS) was dissolved in the AMPS stock solution. To this mixture, the silicone ionomer stock solution was added dropwise, such that the final content of silicone ionomer in the overall solution was 0%, 2%, 5%, 10% 20% or 50% (w/w total solids).

Upon addition of silicone ionomer, the mixtures turned turbid. Following this step, the thermal initiator ammonium persulfate was added to this mixture (1% w/w AMPS) and dissolved completely. A catalytic amount of N,N-tetramethylethylenediamine was added to the mixture to accelerate the curing, and the liquid mixture was poured into a polystyrene mold. The mixtures was covered with a lid to prevent solvent evaporation and allowed to cure at room temperature to form transparent to semi-transparent films. The films were removed from the mold, weighed and washed overnight in DI water to remove unreacted components.

Example 12

Polymer Composite of Pendant-Sulfonated Silicone Ionomer and N-Isopropyl Acrylamide The silicone ionomer (example 1d) was incorporated within a network of poly(N-isopropyl acrylamide) (NIPAAm). In this case, the silicone ionomer was dissolved to a 50% w/v concentration in a 50/50 water/IPA mixture. N-isopropyl acrylamide (NIPAAm) monomer was also dissolved in the 50/50 water/IPA mixture to give a 150% w/v stock solution. The crosslinker N. N methylene bis acrylamide (MBA) and initiator ammonium persulfate were used at a concentration of 1% (w/w NIPAAm) and were dissolved in the monomer solution. The ionically modified silicone was added to the above mixture such that the overall content was 0% to 15% of the total solid content. Finally, catalytic quantities of the accelerator N,N tetramethylene ethylene diamine (TEMED) were used, and the entire mixture was poured in a polystyrene mold. The mixture was cured overnight to form translucent films (except for 5% silicone ionomer loading) which were easily peelable from the polystyrene mold.

The cured films were soaked overnight in DI water to extract unreacted components, and to measure the amount of water imbibed by the films. The films were blotted on tissue paper and weighed to estimate water content. The percentage water absorption was calculated as:

$$\% \text{ uptake} = 100 \times (W_{final} - W_{initial}) / W_{initial}$$

where $W_{final}$ and $W_{initial}$ denote weights after and before water soaking. The 0% silicone ionomer film absorbed 292% w/w water whereas the 15% silicone ionomer film absorbed 232% water under these conditions.

Example 13

Elastomeric Polymer Composite of Silicone Ionomer and Polysilicate

The end-sulfonated silicone ionomer of Example 2b was blended with ethyl polysilicate crosslinker, ranging from 0.1% to 3% w/w loading, and mixed of 0.05% w/w DBTDL catalyst. The mixtures were cast on polyethylene sheets. The mixtures cured to transparent, elastomeric sheets in 4 h.

Example 14

Polymer Composite of Silicone Ionomer and Liquid Silicone Rubber

End-sulfonated silicone ionomer of Example 2b was blended with components A and B of the commercially available formulation of liquid silicone rubber LSR 2050 (Momentive Performance Materials) such that the silicone ionomer was present at 5% and 10% loadings (based on total weight of formulation). The silicone ionomer added formulation was blended to homogeneity and compression molded to yield silicone rubber sheets. The sheets were tested for water uptake by immersing pre-weighed pieces into DI water at room temperature and weighing the dried sheets after 24 h. Water uptake (%) was calculated as previously described. The measurements were done in triplicate. The LSR with 10% loading absorbed 2.5% water whereas the 5% loaded LSR absorbed 1.8% water in 24 h, and the difference between these two values was deemed statistically significant (Two-parameter t-test, $p<0.05$). As expected, the control LSR (0% silicone ionomer) did not absorb any water during this time period.

Example 15

Polymer Composite of Carboxylate Functional Silicone Ionomer and Dimethyl Aminoethyl Methacrylate Carboxylic acid-functional silicone ionomer was synthesized as described in Example 3. The compatibility of this silicone ionomer was checked with several acrylate and methacrylate monomers. It was found to be compatible with dimethyl aminoethyl methacrylate (DMAEMA) in that the DMAEMA and silicone ionomer were miscible in all proportions. The silicone ionomer was blended with the monomer in varying proportions, and a UV initiator (2 methyl propiophenone) and crosslinker ($PEG_{400}$ diacrylate) were added in appropriate amounts proportions:

TABLE 1

| % Silicone ionomer | Wt Silicone ionomer (gm) | Wt DMAEMA (gm) | Wt crosslinker (gm) | Wt initiator (gm) | Wt TEMED (gm) |
| --- | --- | --- | --- | --- | --- |
| 0 | 0 | 2 | 0.1 | 0.2 | 0.05 |
| 1 | 0.02 | 2 | 0.1 | 0.2 | 0.05 |
| 5 | 0.1 | 1.9 | 0.1 | 0.2 | 0.05 |
| 10 | 0.2 | 1.8 | 0.1 | 0.2 | 0.05 |

The formulations were cured under UV irradiation to yield translucent films. The films were tested for water uptake by immersion in DI water at room temperature. The films loaded with silicone ionomer showed up to 50% water uptake over a period of 2 h.

Example 16

Polymer Composite Hydrogels of Peg-Functional Sulfonated Silicone

Polymer composite hydrogels of PEG-functional sulfonated silicone were prepared by blending varying proportions of end-sulfonated silicone ionomer with pendant chains (Example 2c) which is a water-soluble silicone ionomer. The hydrogels comprised following components:

TABLE 2

| Component | Function |
|---|---|
| 2-acrylamido-methyl-2-propanesulfonic acid, sodium salt form (AMPS-Na) | Hydrophilic ionic monomer |
| Dimethyl acrylamide (DMA) | Co-monomer |
| 2-hydroxyethyl methacrylate (HEMA) | Co-monomer |
| Ethylene glycol dimethyl acrylate (EGDMA) | Crosslinker |
| 2-methyl propiophenone (Init) | UV initiator |
| N N N N tetramethyl ethylenediamine | Scavenger |

The following formulations were prepared such that the sulfonate groups in AMPS-Na and silicone ionomer were present in equal ratio, and cured to sheets via UV irradiation (105 mW/cm$^2$), and their water uptake was measured by immersion in DI water at room temperature and measuring the increase in weight. It can be seen from Table 3 below that the water uptake decreased with increase in silicone ionomer content.

TABLE 3

| % Silicone ionomer | % AMPS | % Init | % EGDMA | % DMA | % HEMA | % Uptake (6 h) |
|---|---|---|---|---|---|---|
| 10% | 1.5 | 2 | 0.5 | 43 | 43 | 355% |
| 50% | 7.3 | 2 | 0.5 | 43 | 43 | 159% |

Example 17

Polymer Composite Sealant Composition

A sealant composition comprising the silicone ionomer bearing terminal hydroxyl groups (Example 1e) was prepared by combining the following ingredients:

TABLE 4

| Component | % by wt composition |
|---|---|
| Silanol-terminated PDMS (1500 cP) Momentive Performance Materials | 47 |
| Silanol-terminated silicone ionomer | 47 |
| A-1110 adhesion promoter Momentive performance Materials | 1.5 |
| TEOS | 2 |
| Fumed silica filler | 2 |
| DBTDL catalyst | 0.5 |

Upon addition of the catalyst, the tack-free time (TFT), or the time taken by the formulation to cure at the surface, was measured. Also the mixture was allowed to cure to full strength overnight, and its tensile strength was measured using an Instron Tensile Tester. Measurements were made in triplicate. For the above formulation, an average TFT value of 7 minutes and 28 seconds was obtained, whereas a tensile strength of 1.38 MPa was obtained. While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A polymer composite composition comprising:
(a) at least one silicone ionomer with the general formula $$M^1_a M^2_b M^3_c D^1_d D^2_e D^3_f T^1_g T^2_h T^3_i Q_j \qquad (I)$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$D^1 = R^{10} R^{11} SiO_{2/2}$
$D^2 = R^{12} R^{13} SiO_{2/2}$
$D^3 = R^{14} R^{15} SiO_{2/2}$
$T^1 = R^{16} SiO_{3/2}$
$T^2 = R^{17} SiO_{3/2}$
$T^3 = R^{18} SiO_{3/2}$
$Q = SiO_{4/2}$ where $R^1, R^2, R^3, R^5, R^6, R^8, R^9, R^{10}, R^{11}, R^{13}, R^{15}, R^{16}$ are aliphatic, aromatic or fluoro containing monovalent hydrocarbon radicals containing from 1 to about 60 carbon atoms;

where $R^4$, $R^{12}$, $R^{17}$ are monovalent radical bearing ion-pairs and have the formula (II):

$$-A-I^{x-}M_n^{y+}; \qquad (II)$$

where A is a spacing group selected from a divalent hydrocarbon or hydrocarbonoxy group, where I is an ionic group selected from sulfonate —SO$_3^-$, sulfate —OSO$_3^-$, carboxylate —COO$^-$, phosphonate —PO$_3^{2-}$ and phosphate —OPO$_3^{2-}$ group, where M is hydrogen or a cation independently selected from alkali metals, alkaline earth metals, transition metals, rare earth metals, metals, metal complexes, quaternary ammonium and phosphonium groups, organic cations, alkyl cations, cationic hydrocarbons and cationic polymers; or, zwitterions having the formula (III):

$$—R'—NR''_2{}^+—R'''—I \qquad (III)$$

where R' is a divalent hydrocarbon radical containing from 1 to about 20 carbon atoms, where R'' is monovalent hydrocarbon radical containing from 1 to about 20 carbon atoms and where R''' is divalent hydrocarbon radical containing from 2 to about 20 carbon atoms;

where I is as defined above and, where $R^7$, $R^{14}$ and $R^{18}$ are each independently monovalent radicals selected from —OR$^{20}$, hydrogen, unsaturated monovalent radicals, monovalent epoxy group-containing radicals, monovalent sulfur atom-containing radicals, monovalent organosilane groups and monovalent hydroxyl group containing radicals, and a monovalent hydrocarbon containing one or more of a halogen moiety, a carboxylate moiety, an imine moiety, an isocyanate moiety, an amide moiety, a nitrile moiety, or a tertiary amine moiety containing other than alkyl groups moiety, where R$^{20}$ is hydrogen or a monovalent hydrocarbon radical containing from 2 to about 60 carbon atoms, where superscripts x and y are independently from 1 to 6 and x is a product of n and y, where the subscript a, b, c, d, e, f, g, h, i, j are zero or positive subject to the following limitations: the sum a+b+c+d+e+f+g+h+i+j is greater than or equal to 2 and less than or equal to 6000, b+e+h is greater than zero and d+e+f is at least 1, and,
(b) one or more monomer(s), polymer(s), prepolymer(s) or combinations thereof,
wherein said silicone ionomer is capable of non-covalent crosslinking through the formation of ionic aggregates and of forming a network interpenetrated with the monomer(s), polymer(s), prepolymer(s) and/or their combinations.

2. The composition of claim 1 wherein $R^4$, $R^{12}$, $R^{17}$ are monovalent radical bearing ion-pairs and have the formula (II):

$$-A-I^{x-}M_n^{y+} \qquad (II).$$

3. The composition of claim 1 wherein $R^4$, $R^{12}$, $R^{17}$ are zwitterions having the formula (III):

$$-R'-NR''_2{}^+-R'''-I \qquad (III),$$

where I is an ionic group such as sulfonate $-SO_3^-$, sulfate, $-OSO_3^-$, carboxylate $-COO^-$, phosphonate $-PO_3^{2-}$ and $-OPO_3^{2-}$ phosphate group.

4. The composition of claim 1 wherein the monovalent hydrocarbon radical is independently selected from the group consisting of methyl, ethyl, n-propyl, iso-propyl, n-butyl, isobutyl, tert-butyl, n-pentyl, iso-pentyl, neopentyl, tert-pentyl, hexyl, heptyl, octyl, isooctyl, 2,2,4-trimethylpentyl, nonyl, decyl, cycloalkyl radicals and aryl groups.

5. The composition of claim 1, wherein the monovalent hydrocarbon radicals are independently those selected from the group consisting of cyclopentyl, cyclohexyl, cycloheptyl and methylcyclohexyl radicals.

6. The composition of claim 1 wherein the monovalent hydrocarbon radicals are independently those selected from the group consisting of phenyl, naphthyl; o-, m-and p-tolyl, xylyl, ethylphenyl, and benzyl.

7. The composition of claim 1 wherein the divalent hydrocarbon group of the spacing group A, is an arylene group selected from the group consisting of
$-(CHR')_kC_6H_4(CH_2)_l-$, $-CH_2CH(R')(CH_2)_lC_6H_4-$, $-CH_2CH(R')(CH_2)_lC_6H_3R''-$ and $-CH_2CH(R')(CH_2)_lC_6H_2R_1R''-$ where R' is a hydrogen or defined by $R^1$, R" is a monovalent radical specifically from about 1 to about 20 carbon atoms, sulfur atom(s), nitrogen atom(s), oxygen atom(s) or a radical containing combinations of the above atoms, where l has a value of 0 to 20, and k has a value of 0 to 20.

8. The composition of claim 1 wherein the divalent hydrocarbon group of the spacing group A, is an alkylene group of the formula $-(CHR^{19})_m-$ where m has a value of 1 to about 20 and $R^{19}$ is hydrogen or $R^1$.

9. A polymer composite composition comprising:
(a) at least one silicone ionomer with the general formula $$M^1{}_aM^2{}_bM^3{}_cD^1{}_dD^2{}_eD^3{}_fT^1{}_gT^2{}_hT^3{}_iQ_j \qquad (I)$$

wherein:
$M^1 = R^1R^2R^3SiO_{1/2}$
$M^2 = R^4R^5R^6SiO_{1/2}$
$M^3 = R^7R^8R^9SiO_{1/2}$
$D^1 = R^{10}R^{11}SiO_{2/2}$
$D^2 = R^{12}R^{13}SiO_{2/2}$
$D^3 = R^{14}R^{15}SiO_{2/2}$
$T^1 = R^{16}SiO_{3/2}$
$T^2 = R^{17}SiO_{3/2}$
$T^3 = R^{18}SiO_{3/2}$
$Q = SiO_{4/2}$
where $R^1$, $R^2$, $R^3$, $R^5$, $R^6$, $R^8$, $R^9$, $R^{10}$, $R^{11}$, $R^{13}$, $R^{15}$, $R^{16}$ are aliphatic, aromatic or fluoro containing monovalent hydrocarbon radicals containing from 1 about 60 carbon atoms:

where $R^4$, $R^{12}$, $R^{17}$ are monovalent radical bearing ion-pairs and have the formula (II):

$$-A-I^{x-}M_n^{y+}; \qquad (II)$$

wherein A is a divalent hydrocarbonoxy group of the formula
$(CHR^{19})_m-(O-CHR^{19}CH_2)_m'-(CH_2)_l$ where $R^{19}$ is hydrogen or $R^1$, l has a value of from 1 to 20, and m has a value from 0 to 20 and m' has a value from 0 to 50,
where I is an ionic group selected from sulfonate $-SO_3^-$, sulfate $-OSO_3^-$, carboxylate $-COO^-$, phosphonate $-PO_3^{2-}$ and phosphate $-OPO_3^{2-}$ group,
where M is hydrogen or a cation independently selected from alkali metals, alkaline earth metals, transition metals, rare earth metals, metals, metal complexes, quaternary ammonium and phosphonium groups, organic cations, alkyl cations, cationic hydrocarbons and cationic polymers; or,
zwitterions having the formula (III):

$$-R'-NR''_2{}^+-R'''-I \qquad (III)$$

where R' is a divalent hydrocarbon radical containing from 1 to about 20 carbon
atoms, where R" is monovalent hydrocarbon radical containing from 1 to about 20 carbon atoms and
where R''' is divalent hydrocarbon radical containing from 2 to about 20 carbon
atoms:
where I is as defined above and,
where $R^7$, $R^{14}$ and $R^{18}$ are each independently monovalent radicals selected from $-OR^{20}$, hydrogen, unsaturated monovalent radicals, monovalent epoxy group-containing radicals, monovalent sulfur atom-containing radicals, monovalent organosilane groups and monovalent hydroxyl group containing radicals, and a monovalent hydrocarbon containing one or more of a halogen moiety, a carboxylate moiety, an imine moiety, an isocyanate moiety, an amide moiety, a nitrile moiety, or a tertiary amine moiety containing other than alkyl groups moiety,
where $R^{20}$ is hydrogen or a monovalent hydrocarbon radical containing from 2 to about 60 carbon atoms,
where superscripts x and y are independently from 1 to 6and x is a product of n and y,
where the subscript a. b, c, d, e, f, g, h, i, j are zero or positive subject to the following limitations: the sum a+b+c+d+e+f+g+h+i+j is greater than or equal to 2 and less than or equal to 6000, b+e+h is greater than zero and d+e+f is greater than zero,
and,
(b) one or more monomer(s), polymer(s), prepolymer(s) or combinations thereof.

10. The silicone ionomer composition of claim 1 wherein in formula (II) M is a cation independently selected from Li, Na, K, Cs, Mg, Ca, Ba, Zn, Cu, Fe, Ni, Ga, Al, Mn, Cr, Ag, Au, Pt, Pd, Pb, Sb, Sn, Ru, Rh Ce, Eu, Gd, Co and La.

11. The composition of claim 1 comprising the cation M, which is selected from the group consisting of quaternary ammonium groups, quaternary phosphonium groups, hydrocarbon cations and cationic polymers.

12. The silicone ionomer containing polymer composite composition of claim 1 comprising M which is an organic cation.

13. The composition of claim 12 wherein the organic cation is selected from chlorhexidine, biguanide, quaternary ammonium compounds, quaternary phosphonium compounds, chitosan and its derivatives, cationic peptides such as nisin, pediocin, gomesin, pleuricidin and their derivatives and recombinant forms.

14. The silicone ionomer composition of claim 1 comprising $R^7$, $R^{14}$ and $R^{18}$ each of which is a monovalent organic radical selected from the group of the formulae (IV) to (XIV)

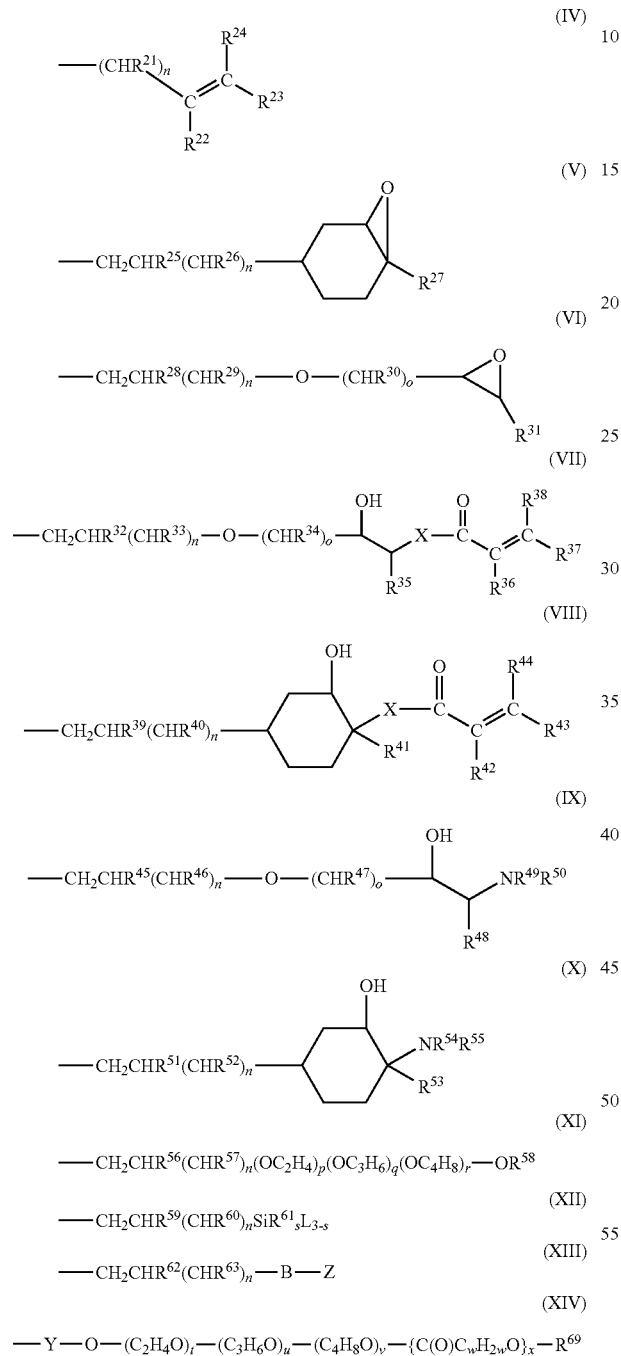

where $R^{21}$, $R^{26}$, $R^{29}$, $R^{30}$, $R^{33}$, $R^{34}$, $R^{40}$, $R^{46}$, $R^{47}$, $R_{52}$, $R_{63}$ are independently selected from —H, —OH, —$R^{66}$ and aliphatic/aromatic monovalent hydrocarbon having from 1 to about 60 carbon atoms, where $R^{22}$, $R^{23}$, $R^{24}$, $R^{25}$, $R^{27}$, $R^{28}$, $R^{31}$, $R^{32}$, $R^{35}$, $R^{36}$, $R^{37}$, $R^{38}$, $R^{39}$, $R^{41}$, $R^{42}$, $R^{43}$, $R^{44}$, $R^{45}$, $R^{48}$, $R^{51}$, $R^{53}$, $R^{56}$, $R^{57}$, $R^{59}$, $R^{60}$, $R^{61}$, $R^{62}$, are independently selected from hydrogen, aliphatic/aromatic monovalent hydrocarbon having from 1 to about 60 carbon atoms, where $R^{58}$ is aliphatic/aromatic monovalent hydrocarbon having from 2 to about 60 carbon atoms, where $R^{49}$, $R^{50}$, $R^{54}$, $R^{55}$ are independently selected from —H, —$C_1H_{21}$OH and aliphatic/aromatic monovalent hydrocarbon having from 1 to about 60 carbon atoms, wherein t is a positive integer where L is a monovalent radical independently selected from halogen, $OR^{64}$, $CO(O)R^{65}$, —N=$CR^{66}_2$, —NCO, —NC(O)$R^{67}$, —C≡N, —N=N and —$NR^{68}_2$, where $R^{64}$, $R^{65}$, $R^{66}$, $R^{67}$, $R^{68}$ are independently selected from a group consisting of hydrogen and alkyl, alkenyl, cycloalkyl and aryl containing from 1 to about 60 carbon atoms, where Z is a monovalent radical independently selected from halogen, $OR^{64A}$, $CO(O)R^{65}$, —N=$CR^{66}_2$, —NCO, —NC(O)$R^{67}$, —C≡N, —N=N and —$NR^{68A}_2$ where $R^{65}$, $R^{66}$, $R^{67}$ are independently selected from a group consisting of hydrogen and alkyl, alkenyl, cycloalkyl and aryl containing from 1 to about 60 carbon atoms, and $R^{64A}$ is selected from a group consisting of alkyl, alkenyl, cycloalkyl and aryl containing from 2 to about 60 carbon atoms, and where $R^{68A}$ is selected from a group consisting of alkenyl, cycloalkyl and aryl containing from 2 to about 60 carbon atoms, where X is divalent radical selected from —O—, —N— and —S— linkages, where Y and B are divalent radical selected from a linear, branched, cyclic hydrocarbon radical or aralkyl radical containing from 1 to about 60 carbon atoms;

where $R^{69}$ is a hydrogen or monovalent alkyl radical with 1 to about 20 carbon atoms or an acyl group, where the subscript n is zero or positive integer and has a value in the range of 0 to about 60, the subscript o is positive integer and has a value in the range of 1 to about 60, subscripts p, q and r are zero or positive and independently selected from a value in the range of 0 to about 100, subject to the limitation of p+q+r being greater than or equal to 1 and s is zero or positive integers and has a value of 0 to 2, where t, u, v and x can be zero or positive integers subject to the limitation t+u+v+x is greater than or equal to 1 and w is a positive integer.

15. The composition of claim 1 wherein a+b≥2, d+e is greater than 0 and g+h is greater than 0.

16. The polymer composite composition of claim 1 wherein the polymer composite composition is derived through the polymerization or crosslinking of one or more polymerizable monomer(s) or prepolymer(s) or polymer(s) or combinations thereof in the presence of the silicone ionomer.

17. The polymer composite composition of claim 1 wherein the polymer composite composition is derived from the polymerization of the silicone ionomer in presence of the one or more polymer(s).

18. The polymer composite composition of claim 1 wherein the polymer composite composition is derived through simultaneous or sequential polymerization of the silicone ionomer in the presence of the monomer(s) or prepolymer(s) or their mixtures.

19. The polymer composite composition of claim 1 wherein the polymer composite composition is obtained by physical or reactive blending of the silicone ionomer with at least one of the polymers or prepolymers or their mixtures.

20. The composition of claim 16 wherein the monomer(s) or prepolymer(s) are independently selected from one or more of free-radical polymerization effective monomers or prepolymers.

21. The composition of claim 20 wherein the monomer(s) or prepolymer(s) comprise at least one free-radical polymerization effective group selected from ethylacrylate, butylacrylate, propylacrylate, N,N-dimethylacrylamide, methacrylic acid, N-isopropyl acrylamide, 2-hydroxy-ethyl-methacrylate (HEMA) and methacrylic acid,3-[tris (trimethylsiloxy)silyl]propyl methacrylate, acrylate and methacrylate functional carbosilane molecules, hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, oligofunctional urethane acrylates, tetraacrylate monomer, polyester acrylate oligomers, and combinations thereof.

22. The composition of claim 16 wherein the monomer(s) or prepolymer(s) are selected from two or more addition polymerizable compounds 23. The monomer(s) or prepolymer(s) of claim 22 comprising one or more compound selected from hydride functional silicones, olefinically unsaturated organic compounds, organomodified silicones, compounds having epoxy, amino, hydroxyl or carboxyl moieties and compounds having isocyanate, hydroxyl or amine groups.

24. The composition of claim 16 wherein the monomer(s) or prepolymer(s) are selected from one or more condensation curable compounds.

25. The monomer or prepolymer of claim 24 comprising two or more condensation polymerisable moieties selected from the group consisting of silanol groups, alkoxysilyl groups, and acyloxysilyl groups.

26. The monomer(s) or prepolymer(s) of claim 24 comprising one or more of compounds forming polyesters, polyamides, polyimides, polyanhydrides, polysulfones, polycarbonates or polyetheretherketones.

27. The monomer(s) or prepolymer(s) of claim 24 comprising two or more condensation polymerisable moieties selected from the group consisting of silanol groups, alkoxysilyl groups, and acyloxysilyl groups, and one or more of compounds that polymerize to form polyesters, polyamides, polyimides, polyanhydrides, polysulfones, polycarbonates, or polyetheretherketones.

28. The monomer(s) or prepolymer(s) of claim 16 comprising of one or more ring opening polymerisable moieties selected from lactides and glycolides.

29. The composition of claim 17 comprising at least one of the polymers selected from sulfonated polystyrene, polyelectrolytes, sulfonated polyesters, polyacrylates, polyacrylamides, polyurethanes, polyethers, polyesters, polylactones, polylactides, polyglycolides, polyacids, polyamides, polyamines, polyethylene, polypropylene, poly(alkylene oxides) such as polyethylene oxide, polypropylene oxide, polybutadiene, polybutylene, polyacrylonitrile, polyvinyl chloride, polyvinyl acetate, polystyrene, polysulfone, PEEK, polycarbonate, polyepoxides, fluoropolymers such as PTFE, polyvinylenedifluoride, synthetic and natural rubber, phenol formaldehyde, melamine formaldehyde, urea formaldehyde, polymers of natural or semi-synthetic origin such as polysaccharides, cellulose, proteins, polypeptides, poly(amino acids), organosilicon polymers such as polysiloxanes, polysilicates, polysilsesquioxanes, polysilanes, ionically modified versions of the above, and isomers and co-polymers of the above polymers.

30. The composition of claim 1 wherein the silicone ionomer and the polymers, prepolymer(s) or monomer(s) interact with each other.

31. The composition of claim 30 wherein the silicone ionomer and the polymers interact via ionic interactions between similar or dissimilar ionic groups 32. The composition of claim 30 wherein the interaction is through hydrophobic interactions, crystalline phases, acid-base interactions, co-ordination complexes, $\pi$-interactions or hydrogen bonding.

33. The composition of claim 1 wherein the silicone ionomer and the monomers or prepolymers are covalently linked through condensation reactions via multiple functional groups in their structures.

34. The composition of claim 33 wherein the condensation reaction is catalyzed by one or more component selected from the group consisting of dibutyl tin dilaurate, tin octanoate, or acid-base salts of titanium, iron, zinc, aluminum, organic ammonium compounds and silanolate salts.

35. The composition of claim 1 further including one or more additives selected from surfactants, co-surfactants, solvents, co-solvents, emulsifiers and foam suppressants, adhesion promoters, fire retardants, anti-oxidants, foam cell stabilizers, rheology modifiers, mold release agents and mixing aids.

36. The composition of claim 1 further including crosslinkers, initiators, catalysts, cure inhibitors, radical scavengers, chain extenders and chain terminators.

37. The composition of claim 1 further including one or more components selected from therapeutically and/or cosmetically active agents, pharmaceutical excipients, pigments and colorants, plasticizers, anti-static agents, tackifiers, lubricants, UV absorbers, anti-fouling agents, antimicrobial agents, biocidal agents.

38. The composition of claim 1 further including reactive or non-reactive fillers to improve the mechanical, thermal or electrical properties of the composition.

39. The composition of claim 38 wherein the fillers are selected from silicone resins, silica, nanosilica, titanium, ceria, fumed silica, particulate forms of oxides of titanium, cerium, aluminum, zirconium and other metals and metalloids; boron nitride, carbon black, carbon nanotubes, graphite, graphene, glass fibers, polysaccharide particles, protein particles, fibers of natural, semisynthetic or synthetic origin, inorganic fillers such as talc, carborundum, mineral clay, mica, and suitable combinations thereof.

40. A healthcare product comprising the polymer composite composition of claim 1 and additionally comprising agents of therapeutic value including one or more of metals, metal ions, bioactives, anti-acne agents, anti-ageing agents, anti-caries agents, anti-fungal agents, anti-microbial agents, anti-oxidants, anti-cancer, anti-viral, anti-inflammatory, anti-coagulants, hemostatic agents, exfoliants, hormones, hormone analogs, enzymes, protein and peptides, medicinal compounds, biocides, external analgesics, oral care agents, oral care drugs, oxidizing agents, reducing agents, skin protectants, essential oils, insect repellents, UV light absorbing agents, solar filters, pigments, hydrating agents, vitamins and combinations thereof.

41. The healthcare product of claim 40 wherein the composition is incorporated into one or more of wound dressings, dressings for scar reduction, drug delivery devices, medical tubing, clinical surfaces, pacemaker leads, pressure sensitive adhesives, wound healing patches, wound management device, medical adhesives, catheters, shunts, valves, stents, transdermal iontophoresis patches, scaffold for tissue engineering, anti-microbial devices, ophthalmic devices, bioinserts, surgical devices, plugs, medical devices, devices for medical storage, childcare products, assisted breathing apparatus, ophthalmic devices, prostheses, reconstructive devices and body implants.

42. The healthcare product of claim 41 comprising a drug delivery device.

43. A hydrogel, cured gel, or elastomeric composition derived from the polymer composite comprising:
   (a) at least one silicone ionomer with the general formula $$M^1_a M^2_b M^3_c D^1_d D^2_e D^3_f T^1_g T^2_h Q_j \quad (I)$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$D^1 = R^{10} R^{11} SiO_{2/2}$
$D^2 = R^{12} R^{13} SiO_{2/2}$
$D^3 = R^{14} R^{15} SiO_{2/2}$
$T^1 = R^{16} SiO_{3/2}$
$T^2 = R^{17} SiO_{3/2}$
$T^3 = R^{18} SiO_{3/2}$
$O = SiO_{4/2}$ where $R^1, R^2, R^3, R^5, R^6, R^8, R^9, R^{10}, R^{11}, R^{13}, R^{15}, R^{16}$ are aliphatic, aromatic or fluoro containing monovalent hydrocarbon radicals containing from 1 to about 60 carbon atoms:

where $R^4$, $R^{12}$, $R^{17}$ are monovalent radical bearing ion-pairs and have the formula (II):

$$-A-I^{x-}M_n^{y+}; \quad (II)$$

where A is a spacing group selected from a divalent hydrocarbon or hydrocarbonoxy group, where I is an ionic group selected from sulfonate $—SO_3^-$, sulfate $—OSO_3^-$, carboxylate $—COO^-$, phosphonate $—PO_3^{2-}$ and phosphate $—OPO_3^{2-}$ group, where M is hydrogen or a cation independently selected from alkali metals, alkaline earth metals, transition metals, rare earth metals, metals, metal complexes, quaternary ammonium and phosphonium groups, organic cations, alkyl cations, cationic hydrocarbons and cationic polymers; or, zwitterions having the formula (III):

$$—R'—NR''_2{}^+\!\!—\!\!R'''\!\!—\!\!I \quad (III)$$

where R' is a divalent hydrocarbon radical containing from 1 to about 20 carbon atoms, where R" is monovalent hydrocarbon radical containing from 1 to about 20 carbon atoms and where R'" is divalent hydrocarbon radical containing from 2 to about 20 carbon atoms;

where I is as defined above and, where $R^7$, $R^{14}$ and $R^{18}$ are each independently monovalent radicals selected from $—OR^{20}$, hydrogen, unsaturated monovalent radicals, monovalent epoxy group-containing radicals, monovalent sulfur atom-containing radicals, monovalent organosilane groups and monovalent hydroxyl group containing radicals, and a monovalent hydrocarbon containing one or more of a halogen moiety, a carboxylate moiety, an imine moiety, an isocyanate moiety, an amide moiety, a nitrile moiety, or a tertiary amine moiety containing other than alkyl groups moiety, where $R^{20}$ is hydrogen or a monovalent hydrocarbon radical containing from 2 to about 60 carbon atoms, where superscripts x and y are independently from 1 to 6 band x is a product of n and y, where the subscript a, b, c, d, e, f, g, h, i, j are zero or positive subject to the following limitations: the sum a+b+c+d+e+f+g+h+i+j is greater than or equal to 2 and less than or equal to 6000, b+e+h is greater than zero and d +e +f is greater than zero, and, (b) one or more monomer(s), polymer(s), prepolymer(s) or combinations thereof.

44. A contact lens, wound dressing, personal care product, health care product, sealants, coatings, adhesives, wood treatment composition, textile treatment composition, insulation, structural, electrical and electronics component molding composition and product thereof comprising of the polymerized composition of claim 1.

45. The composition of claim 19 comprising at least one of the polymers selected from sulfonated polystyrene, polyelectrolytes, sulfonated polyesters, polyacrylates, polyacrylamides, polyurethanes, polyethers, polyesters, polylactones, polylactides, polyglycolides, polyacids, polyamides, polyamines, polyethylene, polypropylene, poly(alkylene oxides) such as polyethylene oxide, polypropylene oxide, polybutadiene, polybutylene, polyacrylonitrile, polyvinyl chloride, polyvinyl acetate, polystyrene, polysulfone, PEEK, polycarbonate, polyepoxides, fluoropolymers such as PTFE, polyvinylenedifluoride, synthetic and natural rubber, phenol formaldehyde, melamine formaldehyde, urea formaldehyde, polymers of natural or semi-synthetic origin such as polysaccharides, cellulose, proteins, polypeptides, poly(amino acids), organosilicon polymers such as polysiloxanes, polysilicates, polysilsesquioxanes, polysilanes, ionically modified versions of the above, and isomers and co-polymers of the above polymers.

* * * * *